(12) United States Patent
Schantl et al.

(10) Patent No.: US 7,848,910 B2
(45) Date of Patent: Dec. 7, 2010

(54) METHOD FOR ANALYZING THE BEHAVIOR OF COMPLEX SYSTEMS, ESPECIALLY INTERNAL COMBUSTION ENGINES

(75) Inventors: Rainer Schantl, Weinburg (AT); Thomas Ebner, Graz (AT); Marie-Sophie Vogels, Graz (AT)

(73) Assignee: AVL List GmbH, Graz (AT)

( * ) Notice: Subject to any disclaimer, the term of this patent is extended or adjusted under 35 U.S.C. 154(b) by 876 days.

(21) Appl. No.: 11/658,092

(22) PCT Filed: Jul. 21, 2005

(86) PCT No.: PCT/AT2005/000289

§ 371 (c)(1), (2), (4) Date: Apr. 10, 2007

(87) PCT Pub. No.: WO2006/007621

PCT Pub. Date: Jan. 26, 2006

(65) Prior Publication Data

US 2007/0288213 A1 Dec. 13, 2007

(30) Foreign Application Priority Data

Jul. 22, 2004 (AT) .............................. A 1253/2004
Jul. 22, 2004 (AT) .............................. A 1254/2004

(51) Int. Cl.
*G06G 7/48* (2006.01)
(52) U.S. Cl. ............................................. 703/6; 703/8
(58) Field of Classification Search .................. 703/2, 703/6, 7, 8
See application file for complete search history.

(56) References Cited

U.S. PATENT DOCUMENTS

| 5,608,842 | A  |    | 3/1997  | Broese et al.         |
|-----------|----|----|---------|-----------------------|
| 6,208,953 | B1 |    | 3/2001  | Milek et al.          |
| 6,240,343 | B1 | *  | 5/2001  | Sarangapani et al. .......... 701/29 |
| 6,304,835 | B1 | *  | 10/2001 | Hiramatsu et al. ............. 703/7 |
| 6,473,658 | B1 |    | 10/2002 | Brose et al.          |
| 7,444,190 | B2 | *  | 10/2008 | Pflugl et al. ................... 700/28 |

OTHER PUBLICATIONS

Brahma et al., "Optimization of Diesel Engine Operating Parameters using Neural Networks", SAE Technical Paper Series, 2003-01-3228, Oct. 2003, 11 pages.*

(Continued)

*Primary Examiner*—Kamini S Shah
*Assistant Examiner*—Herng-Der Day
(74) *Attorney, Agent, or Firm*—Dykema Gossett PLLC

(57) ABSTRACT

A method for analyzing the behavior of complex systems, particularly internal combustion engines, wherein a model is established which shows the dependence of test variables on input variables, calibrating the model based on test values of the real system obtained at the test points subdividing into at least two partial models a first principal influential parameter is identified for the first partial model, an optimal value of the first principal influential parameter is determined at each test point, the first principal influential parameter is interpolated for all plausible constellations of input variables to calibrate the first partial model, another partial model is established to show another subset of test variables in accordance with the input variables and the previously determined first subset of test variables, an additional principal influential parameter is identified for the other partial model, and an optimal value of the additional principal influential parameter is determined at each test point.

16 Claims, 35 Drawing Sheets

OTHER PUBLICATIONS

Schuler et al., "Use of Fast Neural Networks for Model-Based Optimization of Internal Combustion Engines", translated into English by USPTO from "Einsatz schneller neuronaler Netze zur modellbasierten Optimierung von Verbrennungsmotoren", MTZ 61, 2000, pp. 2-9.*

M. Schuler et al., "Einsatz Schneller . . . Verbrennungsmotoren" in MTZ Motor-Technische Zeitschrift, 61 (2000) pp. 2-9.

J. P. Verhoef et al., "Identification of Variables . . . Complex Terrain" in Energy Research Centre of the Netherlands, ECN-C-01-015 (Apr. 2001) pp. 1-23.

Hafner et al., "Mechatronic Design Approach for Engine Management Systems," Darmstadt University of Technology, Institute of Automatic Control, Dec. 2003.

* cited by examiner

Fig. 18
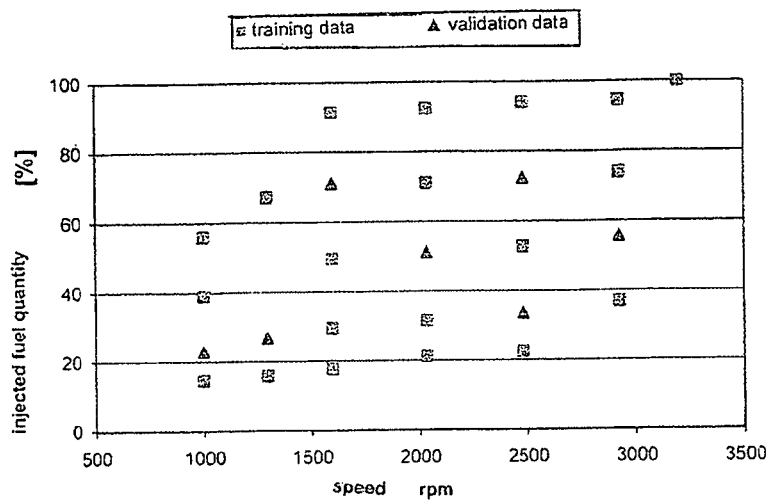
Fig. 19
Fig. 20
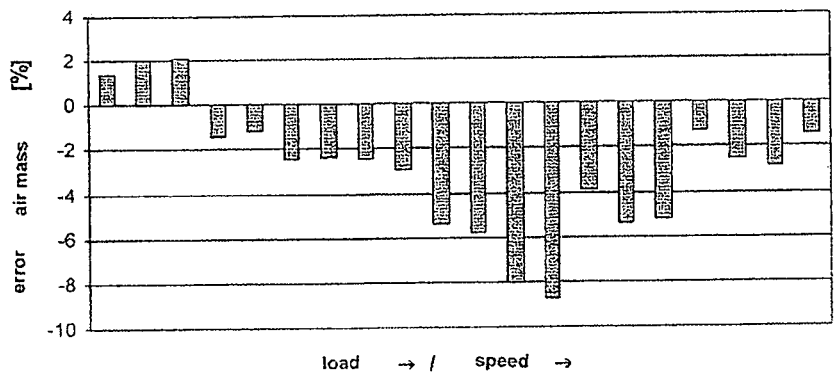

| B/P | brakes | engine | Var 1 | TF |
|---|---|---|---|---|
|  |  |  | P2 offset [Pa] Opt |  |
| 1 | 14.659 | 1000.000 | -1217.994 | 0.000 |
| 2 | 38.971 | 1000.000 | -1751.169 | 0.000 |
| 3 | 56.005 | 1000.000 | -1912.008 | 0.000 |
| 4 | 16.019 | 1300.000 | 1274.838 | 0.000 |
| 5 | 67.206 | 1300.000 | 1209.931 | 0.000 |
| 6 | 17.756 | 1600.000 | 2533.841 | 0.000 |
| 7 | 29.456 | 1600.000 | 2608.806 | 0.000 |
| 8 | 49.501 | 1600.000 | 3032.370 | 0.000 |
| 9 | 91.259 | 1600.000 | 4478.308 | 0.000 |
| 10 | 21.198 | 2035.000 | 6629.160 | 0.000 |
| 11 | 31.504 | 2035.000 | 7748.592 | 0.000 |
| 12 | 70.991 | 2035.000 | 14813.134 | 0.000 |
| 13 | 92.447 | 2035.000 | 17833.172 | 0.000 |
| 14 | 22.574 | 2480.000 | 5438.660 | 0.000 |
| 15 | 52.736 | 2480.000 | 9755.141 | 0.000 |
| 16 | 94.150 | 2480.000 | 10850.952 | 0.000 |
| 17 | 36.769 | 2925.000 | 2095.765 | 0.000 |
| 18 | 73.813 | 2925.000 | 5090.318 | 0.000 |
| 19 | 94.494 | 2925.000 | 5791.613 | 0.000 |
| 20 | 100.000 | 3201.000 | 2849.858 | 0.000 |
| total |  |  |  | 0.000 |
|  |  |  |  | 0.000 |

| B/P | brakes | engine | Var 1 | TF |
|---|---|---|---|---|
| | | | CD [deg] Opt | |
| 1 | 14.659 | 1000.000 | 77.061 | 0.000 |
| 2 | 38.971 | 1000.000 | 69.024 | 0.000 |
| 3 | 56.005 | 1000.000 | 64.788 | 0.000 |
| 4 | 16.019 | 1300.000 | 70.553 | 0.000 |
| 5 | 67.206 | 1300.000 | 68.491 | 0.000 |
| 6 | 17.756 | 1600.000 | 40.806 | 0.000 |
| 7 | 29.456 | 1600.000 | 57.085 | 0.001 |
| 8 | 49.501 | 1600.000 | 63.134 | 0.000 |
| 9 | 91.259 | 1600.000 | 93.120 | 0.001 |
| 10 | 21.198 | 2035.000 | 27.977 | 0.000 |
| 11 | 31.504 | 2035.000 | 41.053 | 0.001 |
| 12 | 70.991 | 2035.000 | 51.320 | 0.001 |
| 13 | 92.447 | 2035.000 | 76.332 | 0.000 |
| 14 | 22.574 | 2480.000 | 24.316 | 0.000 |
| 15 | 52.736 | 2480.000 | 73.411 | 0.000 |
| 16 | 94.150 | 2480.000 | 80.115 | 0.000 |
| 17 | 36.769 | 2925.000 | 44.312 | 0.000 |
| 18 | 73.813 | 2925.000 | 48.466 | 0.000 |
| 19 | 94.494 | 2925.000 | 73.102 | 0.003 |
| 20 | 100.000 | 3201.000 | 83.926 | 0.002 |
| total | | | | 0.012 |
| | | | | 0.001 |

| B/P | brakes | engine | Var 1 | TF |
|---|---|---|---|---|
|  |  |  | CylCalFac IJ1 Opt | absMEP-MEP-SOI WOpt |
| 1 | 14.659 | 1000.000 | 1.299 | 0.000 |
| 2 | 36.971 | 1000.000 | 0.681 | 0.000 |
| 3 | 56.005 | 1000.000 | 0.615 | 0.000 |
| 4 | 16.019 | 1300.000 | 1.196 | 0.000 |
| 5 | 67.206 | 1300.000 | 0.801 | 0.000 |
| 6 | 17.756 | 1600.000 | 1.206 | 0.000 |
| 7 | 29.456 | 1600.000 | 1.173 | 0.000 |
| 8 | 49.501 | 1600.000 | 1.174 | 0.000 |
| 9 | 91.259 | 1600.000 | 0.713 | 0.000 |
| 10 | 21.198 | 2035.000 | 1.152 | 0.000 |
| 11 | 31.504 | 2035.000 | 1.513 | 0.000 |
| 12 | 70.991 | 2035.000 | 1.332 | 0.000 |
| 13 | 92.447 | 2035.000 | 0.611 | 0.000 |
| 14 | 22.574 | 2480.000 | 0.981 | 0.000 |
| 15 | 52.736 | 2480.000 | 0.649 | 0.000 |
| 16 | 94.150 | 2480.000 | 0.334 | 0.000 |
| 17 | 36.769 | 2925.000 | 1.242 | 0.000 |
| 18 | 73.813 | 2925.000 | 1.099 | 0.000 |
| 19 | 94.494 | 2925.000 | 0.887 | 0.000 |
| 20 | 100.000 | 3201.000 | 0.795 | 0.000 |
| total |  |  |  | 0.000 |
|  |  |  |  | 0.000 |

| B/P | :brakes | engine | Var 1 HeatTransFac (-) On | TF |
|---|---|---|---|---|
| 1 | 14.659 | 1000.000 | 7.193 | 0.000 |
| 2 | 38.971 | 1000.000 | 6.667 | 0.000 |
| 3 | 56.005 | 1000.000 | 4.268 | 0.000 |
| 4 | 16.019 | 1300.000 | 7.084 | 0.000 |
| 5 | 67.206 | 1300.000 | 1.776 | 0.000 |
| 6 | 17.756 | 1600.000 | 5.899 | 0.000 |
| 7 | 29.456 | 1600.000 | 4.414 | 0.000 |
| 8 | 49.501 | 1600.000 | 2.148 | 0.000 |
| 9 | 91.259 | 1600.000 | 1.749 | 0.000 |
| 10 | 21.198 | 2035.000 | 3.707 | 0.000 |
| 11 | 31.504 | 2035.000 | 1.998 | 0.000 |
| 12 | 70.991 | 2035.000 | 1.332 | 0.000 |
| 13 | 92.447 | 2035.000 | 2.635 | 0.000 |
| 14 | 22.574 | 2480.000 | 2.834 | 0.000 |
| 15 | 52.736 | 2480.000 | 4.344 | 0.000 |
| 16 | 94.150 | 2480.000 | 3.295 | 0.000 |
| 17 | 36.769 | 2925.000 | 1.112 | 0.000 |
| 18 | 73.813 | 2925.000 | 0.990 | 0.000 |
| 19 | 94.494 | 2925.000 | 1.240 | 0.000 |
| 20 | 100.000 | 3201.000 | 1.104 | 0.000 |
| total | | | | 0.000 |
| | | | | 0.000 |

METHOD FOR ANALYZING THE BEHAVIOR OF COMPLEX SYSTEMS, ESPECIALLY INTERNAL COMBUSTION ENGINES

BACKGROUND OF THE INVENTION

1. Field of the Invention

The present invention relates to a method for analyzing the behavior of complex systems, particularly internal combustion engines, by calculating a model which represents various measured variables as a function of input variables, and which has the following basic steps:

- selecting various measurement points which correspond to different constellations of measured variables, and performing measurements to ascertain measured variables on a real system;
- preparing a model which simulates the dependency of the measured variables on the input variables and calibrating a model on the basis of measured values of the real system obtained at the measurement points.

2. The Prior Art

In many fields of technology it is necessary to simulate complex systems by models in order to obtain information about the systems and perform development work.

A known problem is frontloading, which is concerned with already integrating simulation and analysis in the early conceptual or design phase of a new product in such a way that as many important development decisions as possible may be secured by simulation, i.e., virtual experiments.

This is important in particular because performing measurements on real systems is complex and the measured values are often not obtained in real time. A standard method for performing simulations comprises simulating the system to be analyzed by a simulation model which reflects the basic behavior of the system. This simulation model is parameterized and calibrated by a number of measured values which were obtained on a real system, so that a sufficiently precise correspondence between simulation model and real system is achieved. After the simulation model is provided, further measured values may be calculated in larger numbers and using less effort.

A method of this type is universally applicable in principle, but is not practicable in all cases. Thus, for example, it is necessary in the field of engine development to develop engine control units at a time in which at least initially there is not yet any real data of the engine available. Only at a later time is it possible to obtain real data on test stands, the amount of this data typically being significantly less than the amount of the data calculable by a simulation model.

In order to be able to simulate complex systems with a minimum amount of precision, it is generally necessary to have a sufficient amount of available data, using which such a model may be calibrated. In the following, measurable variables which may be measured on a real system and, in addition, are to be stimulated by the simulation model in order to be able to study the behavior of the system even without performing further measurements are referred to as measured variables. Typical measured variables in developing internal combustion engines having internal combustion are:

- inflowing air mass,
- indexed mean pressure,
- maximum cylinder pressure, and
- exhaust gas temperature pre-catalytic converter and/or turbine.

The following, into consideration as input variables:
- speed
- injected fuel quantity
- charge temperature
- boost pressure
- exhaust gas counterpressure
- air-fuel ratio in the intake
- wall temperatures in the combustion chamber
- start of injection
- ignition lag
- combustion duration
- VIBE form factor The first five variables may be adopted from the test stand measurements; in contrast, the air-fuel ratio is set to infinity, since no exhaust gas recirculation and therefore no fuel is provided in the intake; the start of injection is read out from the data of the control unit (ECU program maps) during the test stand measurement.

The ignition lag, in order to finally determine the actual start of combustion, the combustion duration, and the form factor are set to estimated values as a function of speed and load in order to describe the VIBE combustion function and thus simulate the combustion. The more precise determination is performed in the course of optimization.

In practice, there are often only a small number of real measured values available, so that it is not meaningfully possible using typical methods to simulate the complex and multivariable relationships between the multiple input variables and the many measured values in a valid way.

Using neuronal networks for the model calculation to simulate the engine behavior in detail is known from M. SCHÜLER, M. HAFNER, and R. ISERMANN: "Einsatz schneller neuronaler Netze zur modellbasierten Optimierung von Verbrennungsmotoren [Use of Rapid Neuronal Networks for Model-Based Optimization of Combustion Engines]", MTZ 61, 2000, page 2 et seq. In a dynamic process, a model is decomposed into multiple partial models and the partial models are reassembled into a higher-order model. Such a model calculation is extraordinarily complex and takes little consideration of the actual physical relationships of input variables and measured variables.

Furthermore, an article by J. P. VERHOEF and G. P. LEENDERTSE: "Identification of Variables for Site Calibration and Power Curve Assessment in Complex Terrain", Energy Research Center of the Netherlands, describes preparing simulation models and improving the parameterization using regression methods. With a low number of real measured values, such a method may not achieve any improvement. Similar disadvantages apply for a method as described in M. HAFNER, O. JOST, and R. ISERMANN: "Mechatronic Design Approach for Engine Management Systems", Darmstadt University of Technology, Institute of Automatic Control.

The object of the present invention is to specify a method which avoids these disadvantages and makes it possible to prepare meaningful models which have a high prognosis quality, even with of a small amount of real ascertained data.

SUMMARY OF THE INVENTION

In the scope of a first variation of the method according to the present invention, the following steps are specifically executed:

- subdividing the model into at least two partial models;
- preparing at least one first partial model which simulates a first partial set of the measured variables;
- identifying at least one first main influence parameter for the first partial model;
- determining an optimum value of the first main influence parameter in each measurement point;

interpolating the first main influence parameter for all meaningful constellations of input variables to calibrate the first partial model;

preparing a further partial model to simulate a further partial set of the measured variables as a function of the input variables and the previously ascertained first partial set of the measured variables;

identifying at least one further main influence parameter for the further partial model;

determining an optimum value of the further main influence parameter in each measurement point;

interpolating the further main influence parameter for all meaningful constellations of input variables to calibrate the further partial model.

It is essential for the present invention that when preparing the simulation model, knowledge about the basic behavior of the physical system used as the basis is generally employed to improve the quality of the model. An essential concept is the division of the overall model into partial models, which are causally dependent on one another.

The causality relationship may be taken into consideration optimally in particular by calibrating multiple partial models in sequence, measured variables ascertained in each partial model representing input variables for subsequent partial models.

It is possible per se to simplify the calculation by determining a smaller number of measured variables in each partial model which are to be calculated as a whole. However, especially simple and efficient calculation is made possible in a preferred embodiment variation by ascertaining precisely one measured variable in each partial model.

In a further preferred embodiment variation of the method according to the present invention, a single main influence parameter is assigned in a measured variable and the calibration of the associated partial model is performed by full factorial variation.

A variation of the method in which the optimum value of the main influence parameter in the measured points is determined by calculating a setpoint value for the particular measured variable for various discrete values of the main influence parameter, i.e., at predetermined support points, preparing an interpolation model from the values thus calculated, which indicates setpoint values for the particular measured variable for arbitrary values of the main influence parameter, then minimizing a difference between these setpoint values and the measured actual value of the measured variable and concluding the optimum value of the main influence parameter therefrom is especially preferred. A polynomial approximation may be performed as the interpolation model, however, neuronal networks may also be used for this purpose. The basic consideration is that seeking out the optimum values may be interpreted as minimizing the absolute value of the difference between setpoint value and actual value and prefinished tools are often available for such a minimization. Minimizing an interpolated absolute value function of the difference, however, results in relatively large errors, since continuous differentiability is not provided precisely in the optimum. The preferred achievement of the object results in significantly better results.

This procedure is assembled in a modeling algorithm which is also referred to as "ModelFormula".

A method which may be characterized as follows is preferably used to simulate engines: A general simulation model is used as the basis, which adequately simulates systems of the category of the system to be analyzed here from basic principles. The system category may be a utility vehicle diesel engine having moderate displacement, for example. Before measured values of the real engine are available at all, this general model may be used for pre-analysis, it being clear, however, that the behavior may be correctly described qualitatively, but the quantitative statements will be relatively imprecise. As soon as individual measured values of the real system are available, they are combined with the virtual measured values from the simulation model to allow more precise statements. The combination is not performed by calibration or parameterization of the original model, but rather all measured values are incorporated into a higher-order model which allows more precise prognoses.

A significant improvement of the prognosis quality may be achieved in such a procedure by the following points:

selecting multiple first vectors, each of which represents a specific constellation of the input variables and which cover the meaningful operating range of the system;

obtaining computational values of the measured variable by using the base model to calculate simulation values of the measured variable which are assigned to the first vectors;

selecting multiple second vectors, each of which represents a further constellation of the input variables;

performing measurements to obtain experimental values of the measured variable which are assigned to the second vectors;

expanding each vector by one dimension by incorporating a block variable, which is set to a first value for the first vectors and a second value for the second vectors;

preparing a multivariate regression model, which represents the measured variable as a polynomial function of the expanded vectors of the input variables, on the basis of the previously determined computational values of the measured variable and the experimental values of the measured variable;

determining at least one third vector, which represents a constellation of input variables at which the system is to be analyzed;

expanding the third vector by a block variable which is set to the second value;

calculating the measured variable using the regression model having the expanded third vector as the input variable.

Speed and load are to be viewed as typical input variables for simulating internal combustion engines, as already noted above. Other possible input variables are air-fuel ratio, intake manifold pressure, intake manifold temperature, or exhaust gas counter pressure. Initially, n-dimensional vectors, each of which corresponds to a point of the n-dimensional program map, are calculated from the n input variables which play a role in the particular model. In order to obtain meaningful results, it is necessary to occupy the entire meaningful operating range of the system with measurement points in sufficient density. By using the base model, corresponding calculations are performed for all selected vectors, i.e., at all selected measurement points, in order to calculate the measured variable. The following are examples of relevant measured variables for an internal combustion engine: air mass in/out, indexed mean pressure, wall heat flow, maximum cylinder pressure, etc.

Further values of the measured variable are now experimentally ascertained at further measurement points on a real system.

An essential method step of the preferred method is that a block variable is added to the first vectors of the measured variables which have been processed and the base model has an additional dimension which is set to a first predetermined value. Analogously, the second vectors are expanded, using a block variable, by an additional dimension which is set to a second predetermined value. Of course, the first and the second values of the block variables have to be different from one another. A typical selection would be that the first predetermined value is set to 0 and the second predetermined value is set to 1, for example.

A regression model is now prepared from the totality of the first and the second vectors in the form expanded by the block variable and the calculated and/or measured values of the measured variable. If a value of the measured variable is now to be ascertained for a specific constellation of input variables, a third vector is calculated using these input variables, to which a block variable is added, which is set to the second value. By inserting this expanded third vector in the regression model, the measured variable may be calculated with greater precision.

It has been shown that the procedure described above provides especially precise results which are valuable and relevant for practical use. The method described appears to allow the available information about the qualitative dependence of the measured variable on the input variables to be optimally extracted from the base model. Using the relatively few available experimentally determined measured values, the regression model is modified in such a way that outstanding simulation of the real system is achieved.

The most essential advantage of the above method is that reliable simulation models, which have a high degree of correspondence to the real system, may be prepared using a very small amount of real measured data.

Especially good correspondence results if the regression model is nonlinear in particular. An especially good compromise between computing outlay and precision is achieved by a quadratic regression model.

The method just described may be combined especially advantageously with the method described above and integrated therein.

In the following, the present invention is explained in greater detail on the basis of exemplary embodiments illustrated in the drawings.

BRIEF DESCRIPTION OF THE DRAWINGS

FIG. 18 shows a graph which describes the measured points used;

FIG. 19 shows a bar graph which represents the percent error of the air mass plotted over training points ordered according to speed and load;

FIG. 20, FIG. 21, and FIG. 22 show graphs which describe the variations of the flow coefficients of the scaling factor and/or the boost pressure offset;

DETAILED DESCRIPTION OF THE INVENTION

A modern diesel utility vehicle engine which has the following features was used as the experimental substrate:
- 4 cylinders;
- 4 valves;
- approximately 3 l displacement;
- wastegate turbocharger having intercooler;
- common rail injection system;
- cooled EGR line;
- meets Euro 4 exhaust gas standard.

Figure 1:
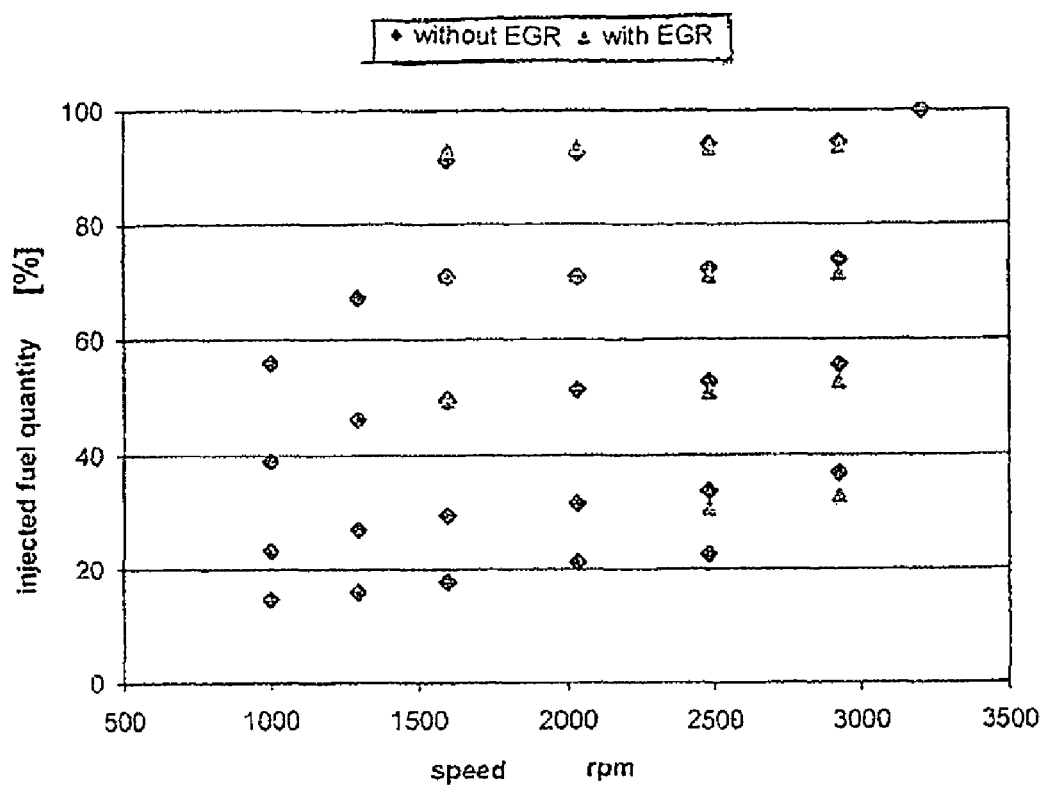
FIG. 1 shows a graph in which measured points are plotted in a program map which is calculated from the speed and the injected fuel quantity.

In the course of the test stand measurement performed various operating points were recorded which were distributed over the entire speed-load program map, as shown in FIG. 1.

The total 41 measured points were measured both with and also without exhaust gas recirculation (EGR). The boundary conditions, such as boost pressure and temperature, exhaust gas, pressure, and start of injection, were also varied in accordance with the operating points. A good distribution of the measured points over the entire program map thus resulted.

The measured variables which were relevant for this work included:
- the air mass measured in the intake system,
- the indexed mean pressure,
- the maximum cylinder pressure,
- the air-fuel ratio,
- the exhaust gas temperature before the turbine.

In the course of the engine development, a base model was prepared which contains, inter alia, the following components, the base model having been prepared using a charge cycle simulation program which is available under the name "AVL BOOST". In the following, this base model is therefore also referred to as the BOOST model:

The program map of the friction mean pressure was calculated from measured cylinder pressures.

A complete model of the turbocharger was used, which was based on the compressor and turbine program maps of the manufacturer. The manufacturer program maps were extrapolated on the basis of stationary measurements.

An external model was prepared for simulating the special behavior of a wastegate valve in the real engine (increasing boost pressure with speed).

A model (MMC, i.e., mixture controlled combustion) was used for the combustion simulation, using which the combustion curve may be calculated from injection rate and internal cylinder states. This model was expanded by an HSDI part (high-speed direct injection), which simulates the premixed combustion and the pre-injection.

In order to simulate the closed feedback loop for controlling the EGR valve, a MATLAB/SIMULINK model was prepared, which includes both the mechanism based on the air excess in the intake system and also the EGR shutdown at high loads. This model was coupled to the BOOST model using the incorporation of a Matlab-DLL interface.

Figure 2:
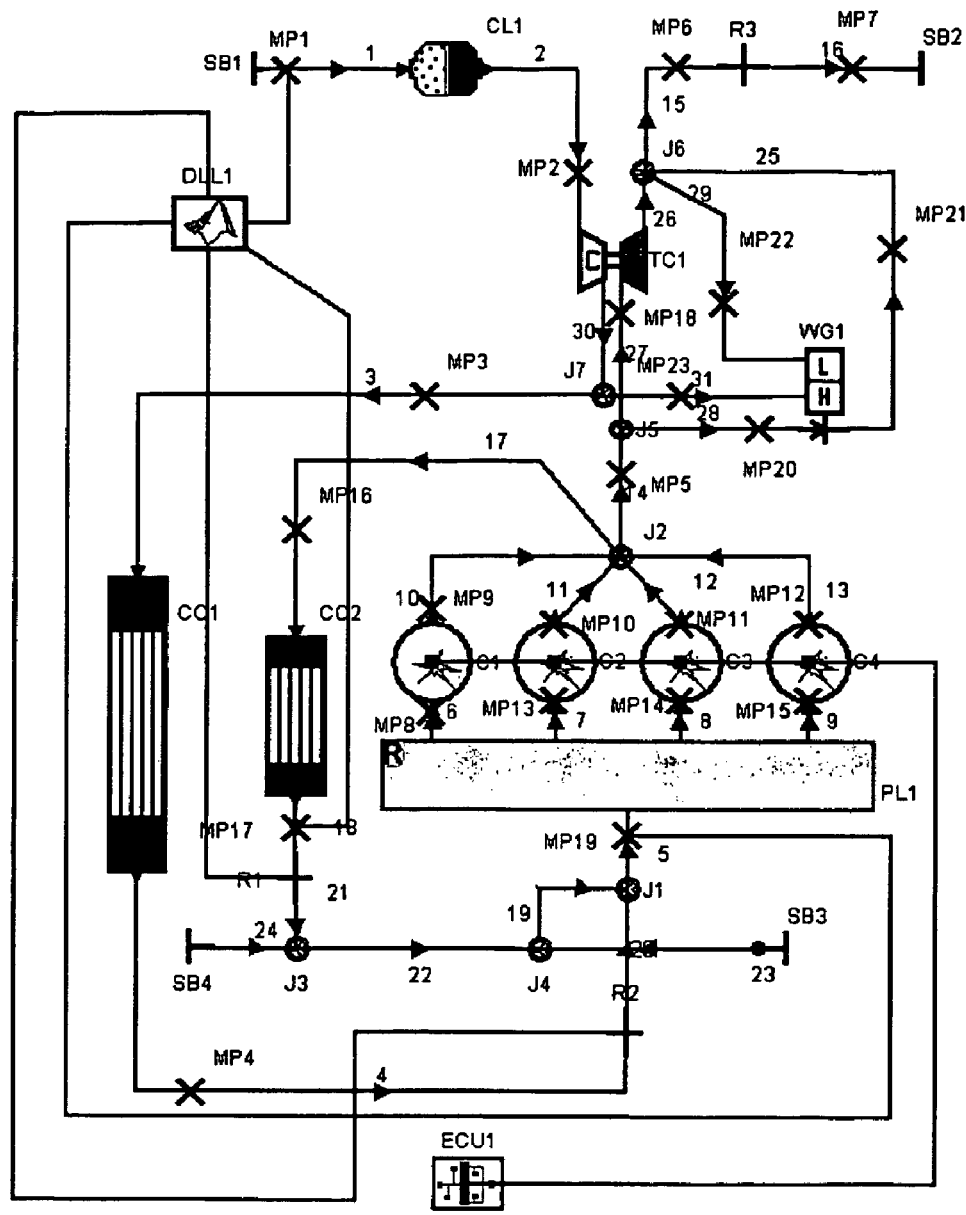
FIG. 2 shows a block diagram which describes the essential components of an analyzed engine and the measured system.

FIG. 2 shows the complete BOOST model for the engine described above.

The surrounding air is taken in via the system boundary SB1 and conducted via the air filter CL1 to the compressor TC1. The compressed air is then guided to the boost intercooler CO1. A further pipe conducts the regulatory pressure to the control element of the externally modeled wastegate valve. The pipes 4, 5, and 20 are used as the connection between boost air cooler and intake manifold PL1; the pipes 6, 7, 8, and 9 stand for the intake channels between the intake manifold and the four cylinders C1, C2, C3, and C4.

The combustion products are combined after the cylinders and conducted to the intake of the turbocharger TC1. The exhaust gas counter pressure may be set via a throttle point R3.

The engine is equipped with an exhaust gas recirculation system. The exhaust gas for the EGR is removed at the node point J2 and finally resupplied to the intake stream via an EGR cooler CO2 and the throttle point R1. This throttle point represents the EGR valve.

The recalculations of the measured operating points displayed very good simulation results. In particular the variables of effective mean pressure and effective consumption were able to be simulated up to the measurement precision ($<1\%$).

Figure 3:
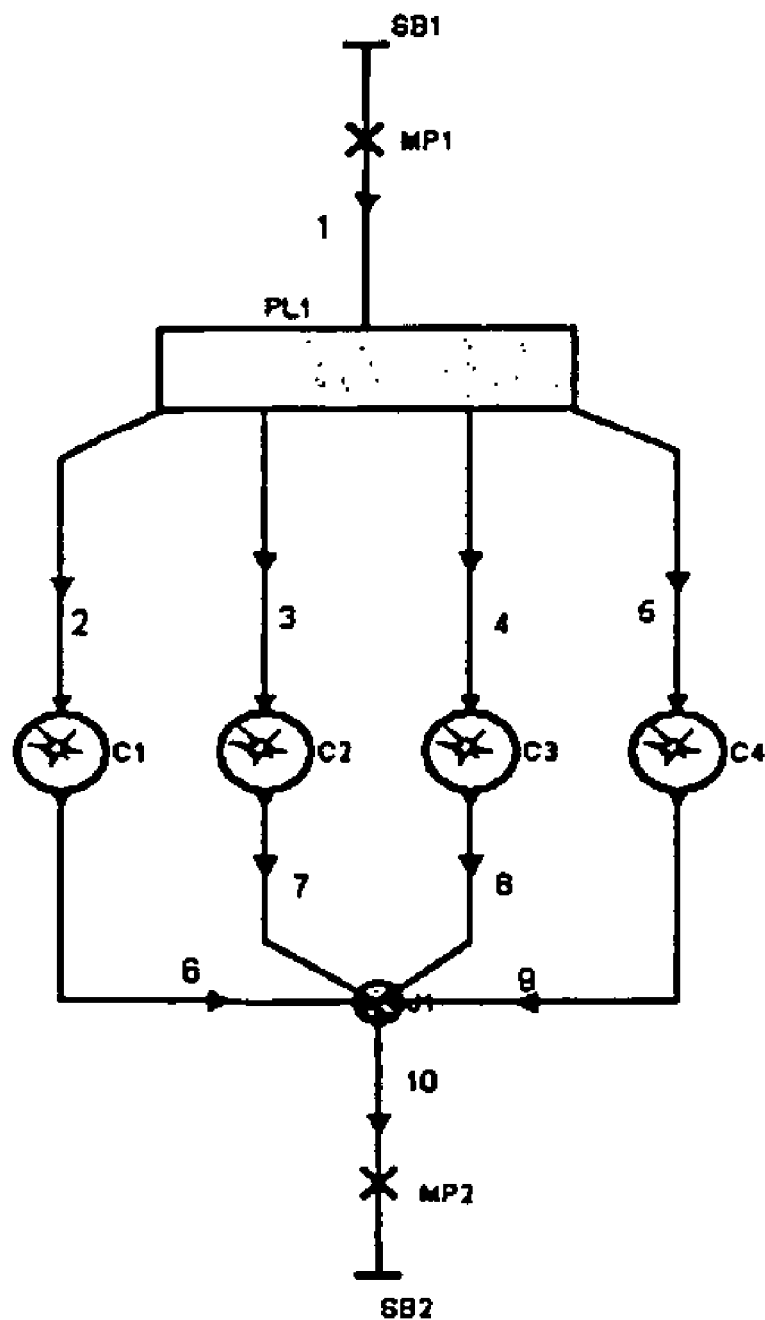
FIG. 3 shows a block diagram which describes a simplified measured system.

This complete BOOST model was reduced to a core model in the scope of the analysis, in which only the four cylinders having the particular connection pipes were still simulated, as shown in FIG. 3.

This simplification had various reasons:

The parameterization expenditure of such a trimmed-down engine model is much less than for a complete model including intake and exhaust systems.

The computing times of the simulation are shortened to a fraction.

The usage of this core model offers the possibility of preparing standard models for the various engine variants.

However, the simulation using a core model also has multiple disadvantages:

The dynamic sequences within an operating cycle may no longer be simulated, since the entire pipe system is not represented.

Due to the missing EGR line, an air-fuel ratio must be predefined in the intake, in order to simulate exhaust gas recirculation.

Constant values are predefined for the system boundaries, so that the gas dynamics which are taken into consideration in an overall model may not be simulated.

The flaws listed here result in worsening of the simulation results of the core model in comparison to the complete model.

Since the exhaust gas recirculation must be simulated via an air-fuel ratio in the intake, a relationship between the exhaust gas mass flow and the A/F ratio must be produced.

The state of the gas directly before the intake valve is observed to derive the equation. The entire EGR mass has already been supplied at this time and has the same composition as the mass in the cylinder at the high-pressure end. The EGR mass may be calculated from the formula for the EGR rate:

$$X_{EGR} = \frac{m_{EGR}}{m_L + m_{EGR}} = \frac{m_{EGR}}{m_{In}} \tag{1}$$

in which:
$X_{EGR}$ exhaust gas recirculation rate
$m_{EGR}$ EGR mass flow
$m_L$ fresh air mass flow
$m_{In}$ total mass flow in the intake duct Furthermore, the following equation applies for the percent component of the fuel in the exhaust gas and thus also in the EGR mass flow:

$$\frac{m_B}{m_{Out}} = \frac{m_{EGR,B}}{m_{EGR}} = \frac{m_B}{m_L + m_B} = \frac{1}{\frac{m_L}{m_B} + 1} = \frac{1}{A/F + 1} \tag{2}$$

in which:
$m_B$ fuel mass flow;
$m_{Out}$ total exhaust gas mass flow;
A/F ratio of fresh air mass to injected fuel mass.

Since both excess air and also combusted fuel are present in the EGR mass flow, the A/F ratio in the intake results from the ratio between the existing fresh air mass and the combusted fuel mass:

$$A/F_{In} = \frac{m_{In,L}}{m_{In,B}} = \frac{m_L + m_{EGR} - m_{EGR,B}}{m_{EGR,B}} \tag{3}$$

If one combines the equations 1, 2, and 3, a relationship is obtained between the EGR rate and the air-fuel ratio in the intake and the ratio of fresh air mass to injected fuel:

$$EGR = \frac{1 + A/F}{1 + A/F_{In}} \text{ with } A/F = \frac{m_L}{m_B} \tag{4}$$

Using this equation 4, the exhaust gas recirculation rate for the predefined A/F ratio in the intake, the predefined injected fuel quantity, and the simulated fresh air mass may be determined later and thus the EGR rate may be used as an input variable for the model.

In order to use the EGR rate directly as an input variable, the actual air-fuel ratio (A/F or k) must be incorporated as a further variation variable. However, the exhaust gas recirculation rate for the predefined A/F ratio in the intake, the predefined injected fuel quantity, and the simulated fresh air mass may be determined later using equation 4 and the EGR rate may thus be used as an input variable.

In the course of the experiments, inter alia, the VIBE function was used as the combustion model in BOOST in order to simulate the time curve of the fuel conversion.

VIBE has established by observation of the combustion procedure on homogeneous fuel-air mixtures that an exponential curve represents a good approximation of real combustion curves. From this obtained knowledge, VIBE developed the burn through function (also referred to as the conversion rate), which is defined as:

$$x = 1 - e^{c-\left(\frac{t}{t_0}\right)^{m+1}} \tag{5}$$

in which:
x conversion rate (ratio of combusted to total fuel mass);
C conversion parameter;
$t_0$ combustion duration;
m form factor.

Under the arbitrary determination that at time to all but 0.1% of the total fuel is to be converted, the numeric value C=−6.9 is obtained for the constant C.

By deriving the burn through function, the combustion curve is obtained, which describes the instantaneous specific combustion and/or conversion speed at every instant of the combustion.

$$\frac{\dot{x}}{x} = \frac{dx}{d(t/t_0)} = 6.9 \cdot (m+1) \cdot \left(\frac{t}{t_0}\right)^m \cdot e^{-6.9\left(\frac{t}{t_0}\right)^{m+1}} \tag{6}$$

Figure 4:
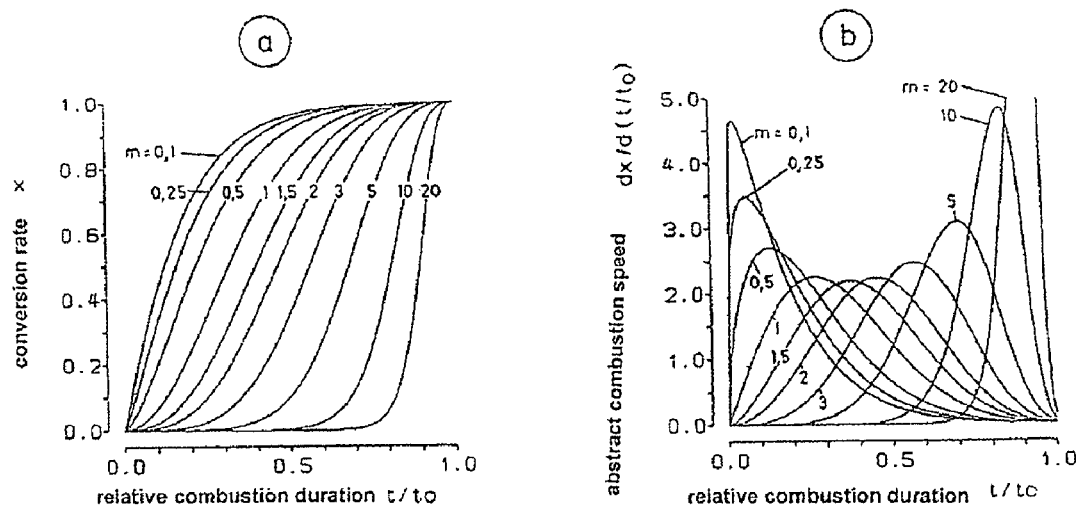
FIG. 4 shows graphs which explain the VIBE factor.

The VIBE form factor describes the form of the combustion curve. The influence is illustrated in FIG. 4.

It may be seen that the energy conversion occurs later the larger the m factor (graph a). The focal point position, i.e., the point of the combustion curve at which 50% of the fuel has been converted into heat, is displaced in the direction "later" with increasing m factor. A value of the form parameter m of 2.3 approximately corresponds to a symmetrical combustion curve (graph b).

In a diesel internal combustion engine, the combustion curve may be best described by a form factor between 0.1 and 1, since a rapid conversion of the fuel occurs due to the high compression and the high pressure.

An essential component of the method according to the present invention is the use of polynomial regression models.

In the polynomial regression models, one attempts to model the output variables of the engine (e.g., torque, cylinder pressure, etc.) using the input variables (e.g., speed, injected fuel quantity, start of injection, etc.) with the aid of polynomial functions.

At the beginning, there is empirical model calculation. Using a mathematical model, the input variables of the system are linked to its output variables. A separate model is prepared for each output variable. An order (up to 10) may be predefined for the polynomial functions. In addition to the main effects, the interactions between the input variables (interaction terms) are also taken into consideration (equation 7).

$$u = a_0 + a_1 x_1 + a_2 x_2 + \ldots + a_i x_i + \ldots + b_1 x_1 x_2 + \ldots + c_1 x_1^2 + \ldots + c_i x_i^2 + \ldots \tag{7}$$

The precision of the model estimation grows with the number of measurements, however, the complexity thus also increases.

The actual model estimation is performed with the aid of the method of least squares. The model coefficients are estimated so that the sum of the squares of the errors is minimized. The error is equal to the deviation of the model calculation from the support values.

The quality of the model thus resulting is checked using various statistical test functions. The individual polynomial terms are checked for their significance and eliminated if necessary. By this principle of automatic reduction of the model order, a simplified model is obtained which is easy to interpret and simultaneously reduces the number of degrees of freedom. The non-significant model terms are removed from the model and the prediction quality is thus improved. Over-determined models may also be avoided, which often have very poor behavior between the support points.

Finally, the algorithm may implement transformations of output variables, so that the best output variable distribution results. A model which is precisely tailored to the data thus results.

A total of 2880 simulation data sets are used as the basis, which were calculated by a full factorial variation of the parameters listed in Table 1 with the aid of BOOST: speed (speed), injected fuel quantity (mB), air-fuel ratio (A/Fint), in order to simulate exhaust gas for circulation, intake manifold pressure (p2) and temperature (T2) and exhaust gas counter pressure (p3). The start of injection (SOI) was taken from a program map as a function of speed and load and corresponds to the measured data; the coolant temperature (Tcoolant) was not varied.

The selected operating points are distributed over the entire program map and thus form a good foundation for an improvement over the entire program map.

All eight variables are also available as input variables, as in the simulation:
  speed (speed),
  injected fuel quantity (mB),
  EGR rate (EGR),
  charge temperature (T2),
  boost pressure (p2),
  exhaust gas counter pressure (p3),
  start of injection (SOI),
  coolant temperature (Tcoolant).

Only the following variables may be provided as output variables
  inflowing air mass,
  indexed mean pressure,
  maximum cylinder pressure,
  air-fuel ratio.

TABLE 1 variation parameters for BOOST calculation

| | Variation parameter | | | | | | | |
|---|---|---|---|---|---|---|---|---|
| | Yes Speed [rpm] | Yes mB [%] | Yes A/Fint [—] | Yes T2 [K] | Yes P2 [Pa] | Yes P3 [Pa] | No SOI [°KW before TDC] | No Tcoolant [K] |
| | 500 | 9 | 150 | 293 | 90,000 | 100,000 | According to program map | 353 |
| | 1000 | 36 | 250 | 305 | 130,000 | 200,000 | | |
| | 2000 | 73 | 350 | 320 | 190,000 | 350,000 | | |
| | 3000 | 100 | 100,000 | | 250,000 | | | |
| | 3400 | | | | | | | |
| Number of variation parameters | 5 | 4 | 4 | 3 | 4 | 3 | 1 | 1 | Calculations 2880 |

Furthermore, it is to be noted that the variation boundaries are outside the measurement data provided: for example, the speed was varied on the test stand between 1000 and 3200 rpm, but from 500 to 3400 rpm in the simulation. The reason for this is that the model calculation requires a support point network which is distributed as uniformly as possible over the experimental space, so that the model quality reaches an acceptable value.

The output variables which are relevant for the engine components "cylinder" are ascertained from the results of the boost calculation and are:
  air mass in/out (M_Lx)
  enthalpy flux in/out (M_Enthx)
  indexed mean pressure (IMEP)
  wall heat flow (WHF)
  maximum cylinder pressure (PFP)
  air-fuel ratio (A/F)

These values are modeled as a function of the eight input variables using a simple regression model and thus provided for the real-time simulation.

Figure 5:
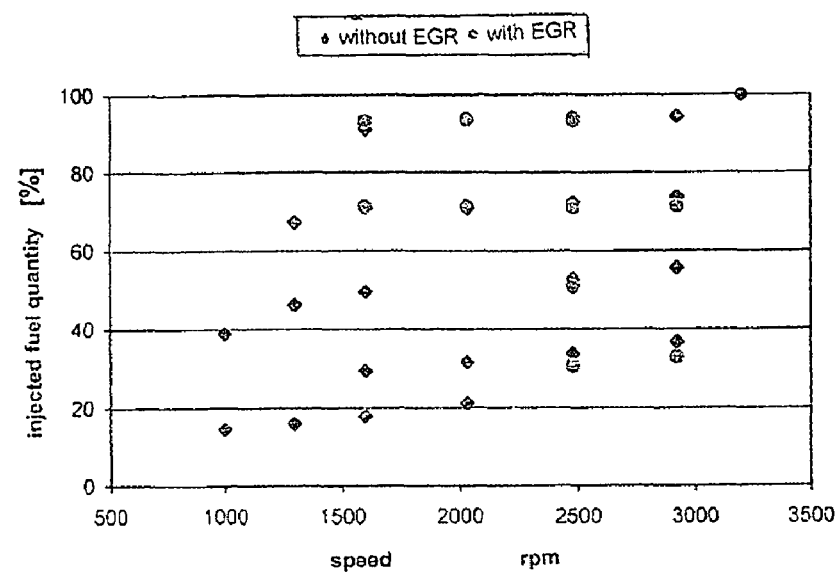
FIG. 5 shows a graph corresponding to that from FIG. 1, in which the actual measured points used are plotted in the program map.

From the 41 available measured points of the experimental substrate, 32 operating points were selected as the training data set (FIG. 5). The nine remaining data sets were used later for validating the results.

The enthalpy fluxes and the wall heat flow are not measured and may be calculated via a heat balance if necessary.

Various possibilities have been analyzed for combining the simulation data and the measurement data for the model calculation:

1) Offset allowance to the output variable, ascertained via the mean arithmetic error;
2) Offset allowance to the output variable, ascertained via the mean square error;
3) Factor multiplication of the output variable;
4) Equivalent addition of the measured data to the simulation data;
5) Equivalent and multiple addition of the measured data to the simulation data;
6) Incorporation of a block factor as a further variation parameter (achievement of the object according to the present invention).

These six possibilities are described in greater detail in the following:

The first possibility 1) corresponds to the original assumption: one assumes that the BOOST simulations may represent a good relationship of the individual engine variables, but do not have a level shift over the program map. This level shift is to be compensated for by a simple increase or decrease of the model.

In this case, the delta by which the model is to be increased or decreased is ascertained via the mean arithmetic error:

$$\Delta_{arith} = \frac{1}{n}\sum_{n}^{1}(u_{Meas} - u_{Boost}) \quad (8)$$

in which:

$u_{Meas}$ measured values;

$u_{Boost}$ values of the simulation model using measured input variables;

n number of the measured points.

This delta is added to the particular output variable after the regression, i.e., after the model calculation:

$$u_{new} = u + \Delta_{arith} = a_0 + \Delta_{arith} + a_1 x_1 + \ldots + a_i x_i + \ldots + b_1 x_1 x_i + \ldots + c_1 x_1^2 + \ldots + c_i x_i^2 \quad (9)$$

The variation 2) nearly corresponds to the first possibility 1). However, the mean square error is used as the foundation here in order to calculate the offset:

$$\Delta_{quadr} = \frac{\Delta_{arith}}{|\Delta_{arith}|} \cdot \frac{1}{n}\sqrt{\sum_{n}^{1}(u_{Meas} - u_{Boost})^2} \quad (10)$$

The mean square error is multiplied by the standardized arithmetic error from possibility 1 in order to maintain the sign, i.e., whether the model is to be increased or decreased.

The square error causes larger deviations to be weighted higher than smaller deviations, so that the model is more strongly oriented to the noteworthy differences.

Possibility 3): multiplication by a factor which is calculated from the ratio between the measured values and the simulation values (equation 11), based on the idea that the actual air expenditure is often simulated too low at high loads and correctly at low loads.

$$\alpha = \frac{1}{n}\sum_{n}^{1}\left(\frac{u_{Meas}}{u_{Boost}}\right) \quad (11)$$

One then multiplies using the factor thus calculated (equation 12), how much the model increases or decreases is thus a function of the absolute value of the output variable: for example, larger air masses are corrected more strongly than smaller air masses.

$$u_{new} = \alpha * u \quad (12)$$

Possibility 4) is the simplest of the six possibilities. The measured data is inserted equivalently into the list of the simulation data. A normal regression is subsequently performed, so that a second-order mixed model of simulation and measured data results.

In possibility 5) as well, the measured data is added unchanged to the simulation data before the model calculation. However, the measured data sets are multiplied (in this case tenfold) in order to give greater weight to the few 32 measured values in contrast to the almost 3000 simulation values.

The last possibility 6) according to the present invention also incorporates the measured data in the model calculation, however, a further variation parameter is inserted. This newly added block factor is set to zero for the simulation data and one for the measured data and causes the model to skew toward the measured points.

Figure 6:
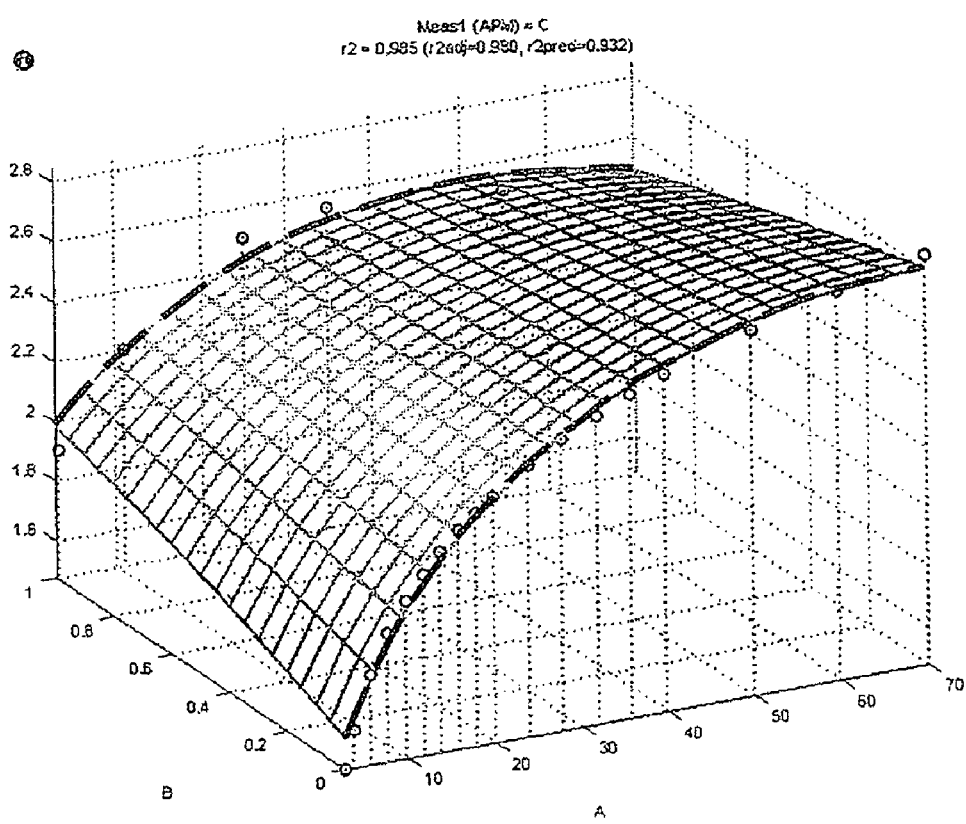
FIG. 6 shows a graph which explains the method according to the present invention.

The method of operation is shown in the illustration of FIG. 6.

In the front, the values of a logarithmic function (C=log (A)+1) are plotted over their input variable A. These function values are simulated by a second-order polynomial (interrupted line) and have the block factor B=0. A further 5 points having B=1 are added to this data, whose values are somewhat above and/or somewhat below the particular functional value. The model now receives its shape due to the many points on the "B=0" side. However, it easily tips toward the five support points which represent the measured data on the "B=1" side.

Because the model is described by a second-order polynomial, the block factor only has a linear influence and interactions with the other input variables. Therefore, one may preclude the model from running into infinity on the "B=1" side in the extrapolated range, i.e., outside the support points provided.

Using this method, it is possible to weight the measured data particularly, but to predefine the general form of the model through the simulation data. An easy change of the model is also permitted without adding a constant offset over the entire program map.

The block factor is set to one for the actual output variable after the model calculation (equation 13), since the overall model is only used in this way.

$$u_{new} = a_0 + d_0 B + a_1 x_1 + \ldots a_i x_i + \ldots + b_1 x_1 x_i + \ldots + d_1 x_1 B + \ldots + d_i x_i B + c_1 x_1^2 + \ldots + c_i x_i^2 = (a_0 + d_0) + (a_1 + d_1)x_1 + \ldots + (a_i + d_i)x_i + \ldots + b_1 x_1 x_i + \ldots + c_1 x_1^2 \quad (13)$$

The following results of the training data are shown on the basis of a representative speed. The remaining support points have very similar results and reinforce the results explained here.

In the following, the results are checked in summary on the basis of the nine validation data sets.

The graph show the particular standardized output variable, plotted over the load, at 2480 rpm. For the standardization, division was performed by the particular highest measured value measured.

Four load points are shown in each case, both without EGR (exhaust gas recirculation) and also with EGR. For reasons of clarity, only three possibilities are shown per graph. The names in the captions correspond to the six possibilities:

1.) SimModel+arith. Offset->Offset allowance to the output variable, ascertained via the mean arithmetic error;
2.) SimModel+quadr. Offset->Offset allowance to the output variable, ascertained via the mean quadratic error;
3.) SimModel*Factor->Factor multiplication of the output variable;
4.) SimMeasModel single->Equivalent addition of the measured data to the simulation data;
5.) SimMeasModel tenfold->Equivalent and multiple addition of the measured data to the simulation data;
6.) SimMeasModel B=0/1->Incorporation of a block factor as a further variation parameter (achievement of the object according to the present invention).

The curve having the large rectangle corresponds to the measured value, the curve having the diamond corresponds to the values simulated without improvement (->SimModel, output base).

The four output variables of inflowing air mass, indexed mean pressure (IMEP), maximum cylinder pressure (PFP), and air-fuel ratio (A/F ratio) are compared to the particular measured data separately from one another.

Figure 7:
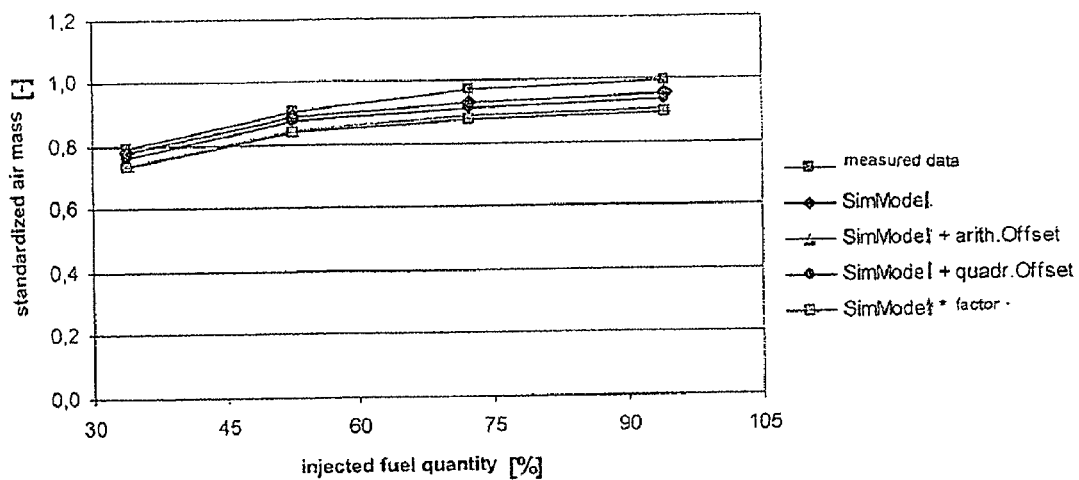
FIG. 7 shows graphs which display the quality of the method according to the present invention.
Figure 7:
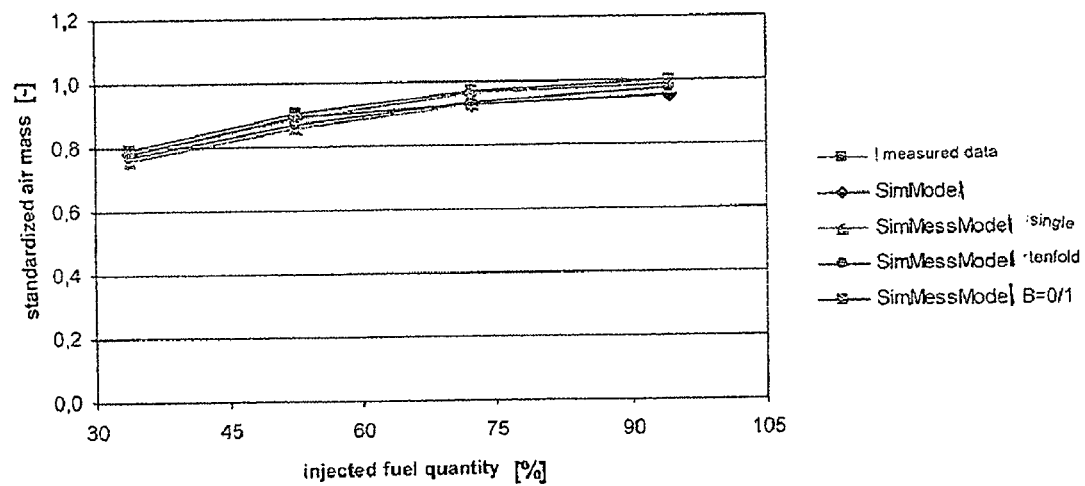

The simulated air mass already shows very good results in the output base in the points without EGR (FIG. 7). In the points with EGR, the qualitative precision is also sufficiently good: the shape of the curves corresponds (FIG. 8).

However, it has been shown that the simulation of the exhaust gas recirculation using the core model is very problematic: a large level difference is obtained between the measured and the simulated air masses. The mean error becomes quite large due to this level difference and this error determines the compensation in the first three possibilities. As a result, worsening is obtained in the points where the pure simulation model already has shown very good results (FIG. 7) and hardly any improvement is obtained in the points having a larger difference (FIG. 8).

The simple adding of the measured data, both singly and also tenfold, has positive effects, however, the tendency that the model is oriented neither to the measured data nor to the simulation data may be recognized here.

Figure 8:
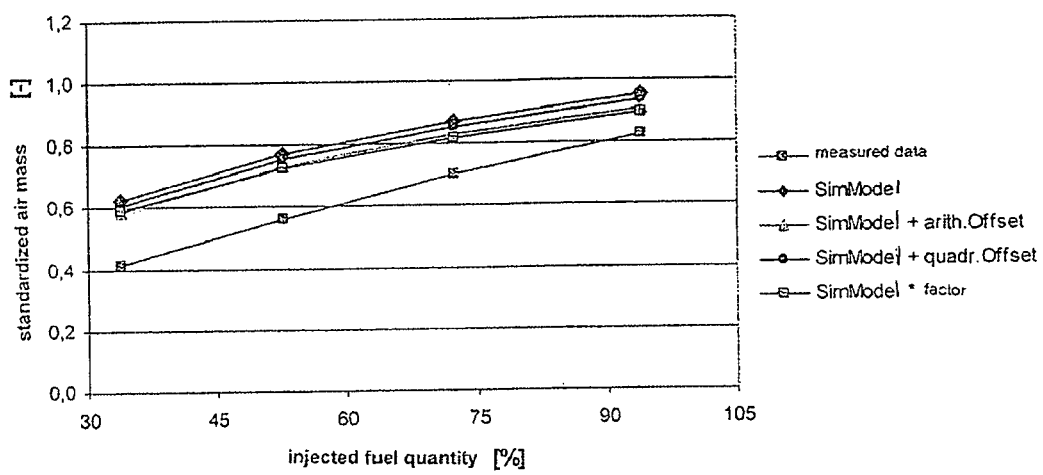
FIG. 8 through FIG. 14 show further graphs which display the quality of the method according to the present invention.
Figure 8:
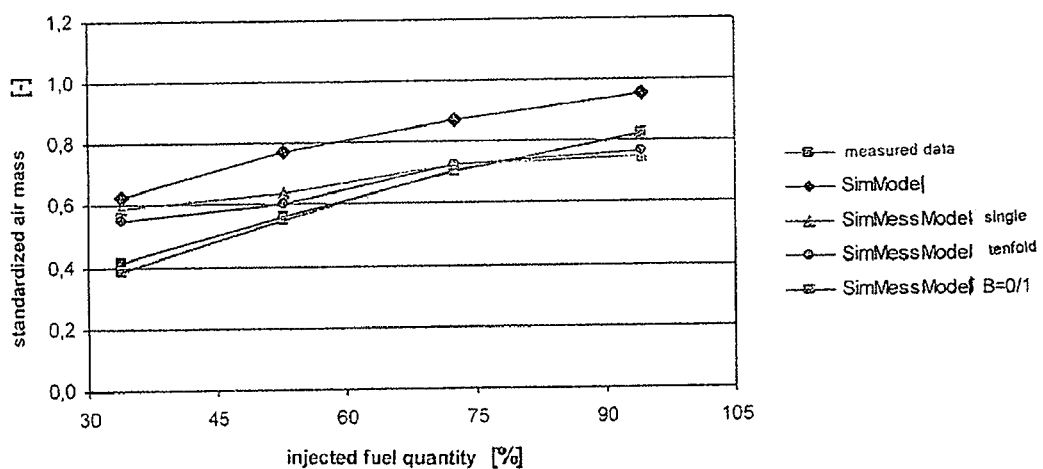

The idea according to the present invention of providing the compensation by incorporating a block factor provides the best results both in the operating points without EGR (FIG. 7) and also in the points with EGR (FIG. 8).

For the indexed mean pressure, it is clear that the curve shape of the unimproved simulation models does not always qualitatively correspond. The simulation results in different values than the measurement here. It may also be established that the full load values are reproduced well, while the part load is simulated having large errors. This shows that BOOST is very well suitable for the full load layout, but currently still has deficiencies in the previous calculation of the part load.

Figure 9:
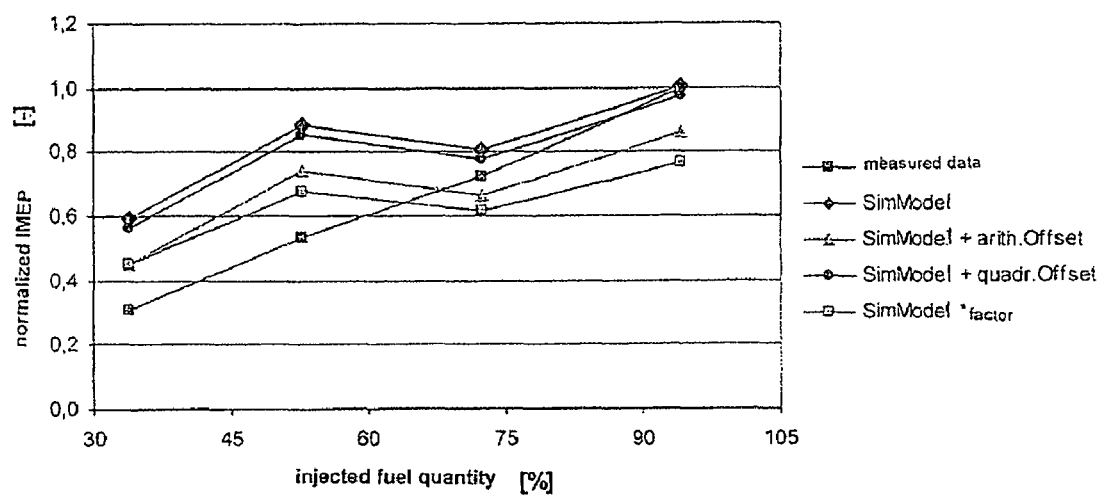
Figure 9:
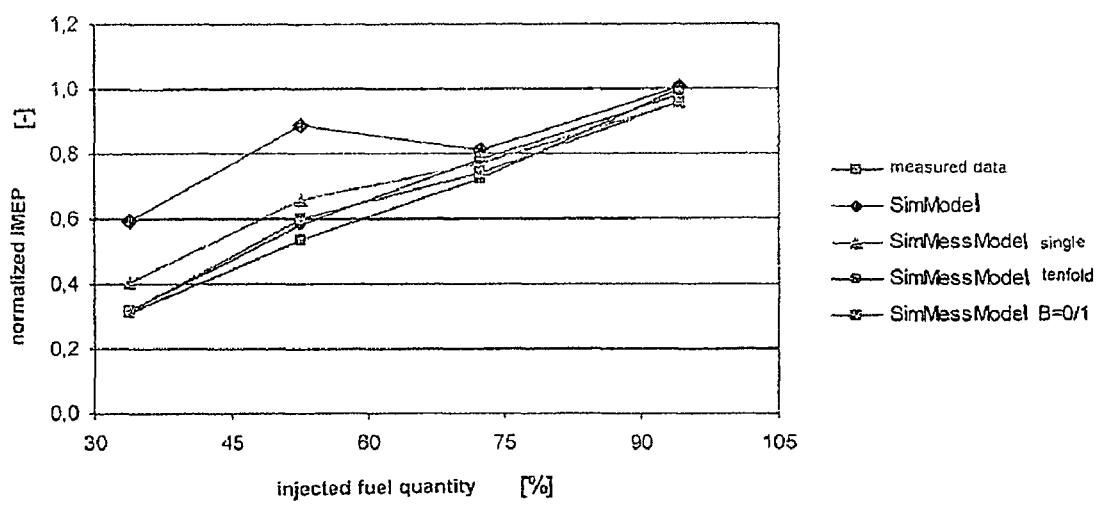
Figure 10:
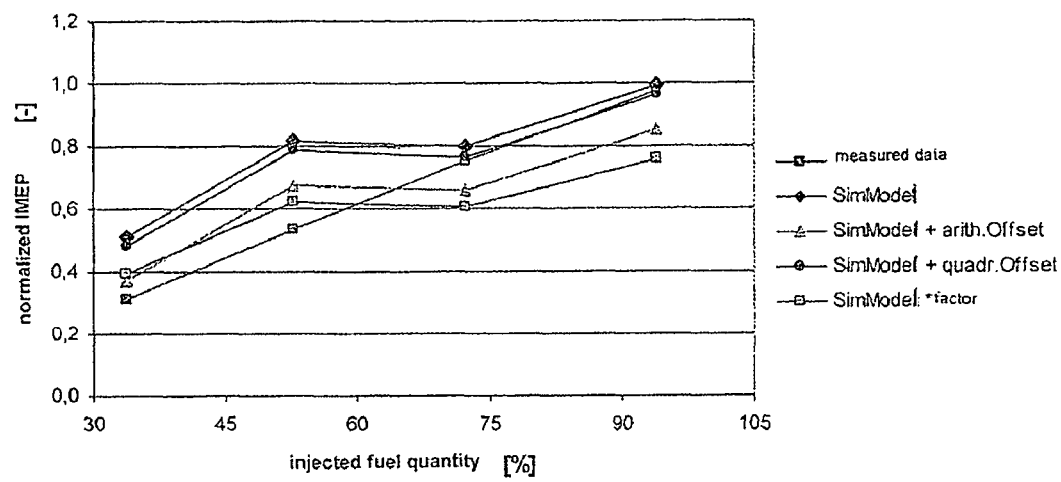
Figure 10:
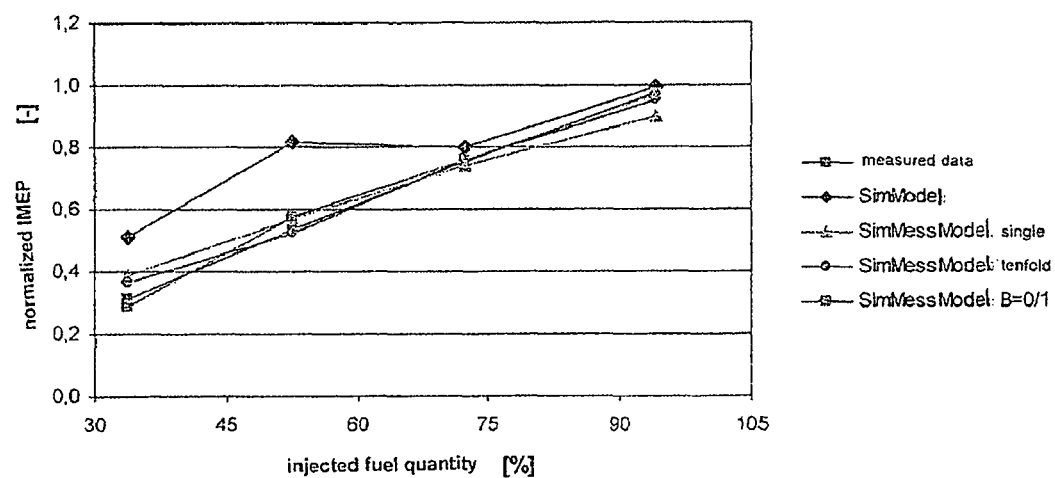

Because the curve shapes of simulation and measurement are not identical, the first three possibilities are not capable of compensating for the errors, since in all three cases a constant factor is calculated, which is added or multiplied (FIG. 9, FIG. 10). A large disadvantage in the multiplication by a factor, for example, is that precisely the high IMEP values of the full load are more strongly corrected than the entirely incorrectly located part-load variables. Therefore, the advantages of the simulation program BOOST are not used in the full load calculation.

FIG. 9 and FIG. 10 show that the incorporation of the block factor causes fitting of the model to the measured points, also in the points having large differences. This possibility also provides the best results here.

However, good results are also achieved by the single adding of the measured data, the incorporation multiple times being better.

Further disadvantages of the first three possibilities become apparent in the compensation of the maximum cylinder pressure:

Since the measured value lies below the simulated value once and above the simulated value once, the deviations cancel out mutually, so that the mean error and thus the offset and/or the factor is almost equal to zero. For this reason, there is no improvement of the model, with the arithmetically ascertained offset, there is even a slight worsening in the high load points (FIG. 11, FIG. 12).

Figure 11:
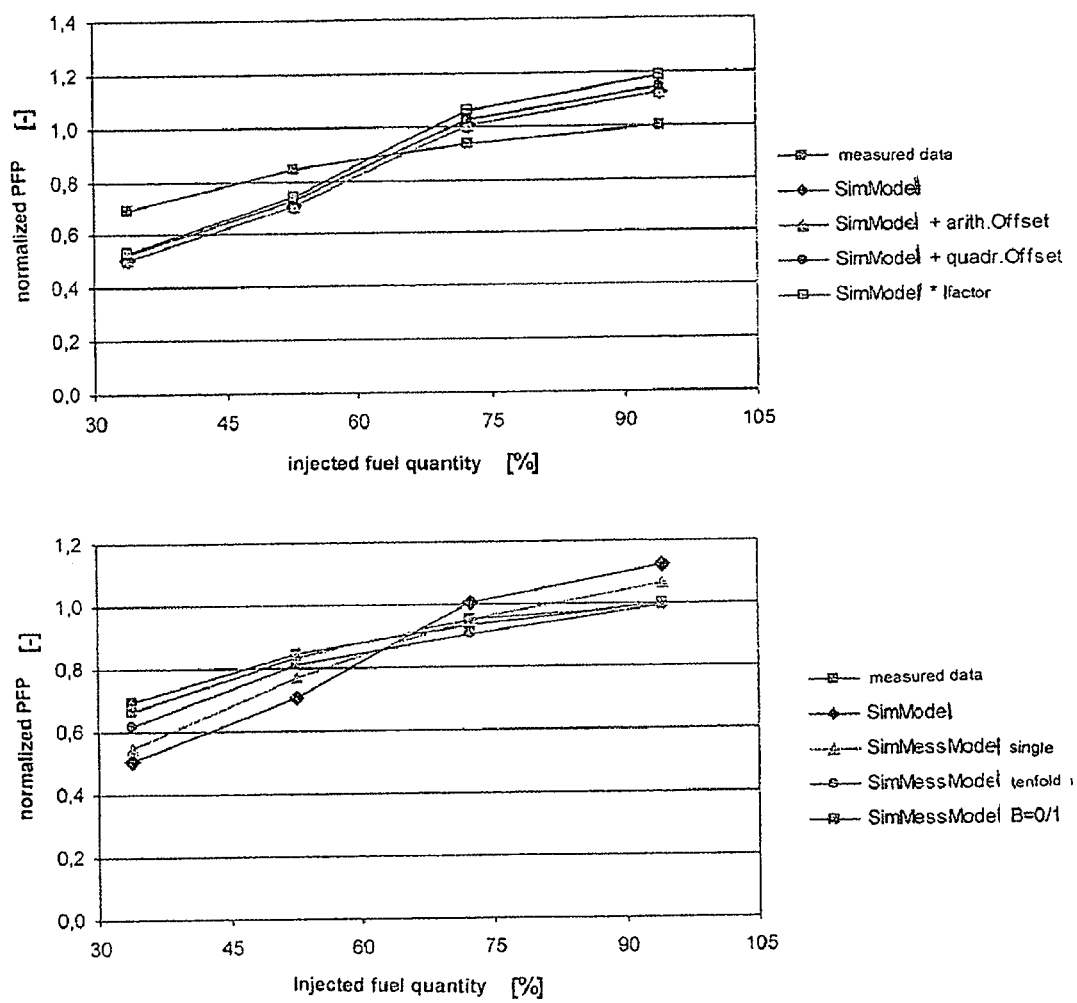
Figure 12:
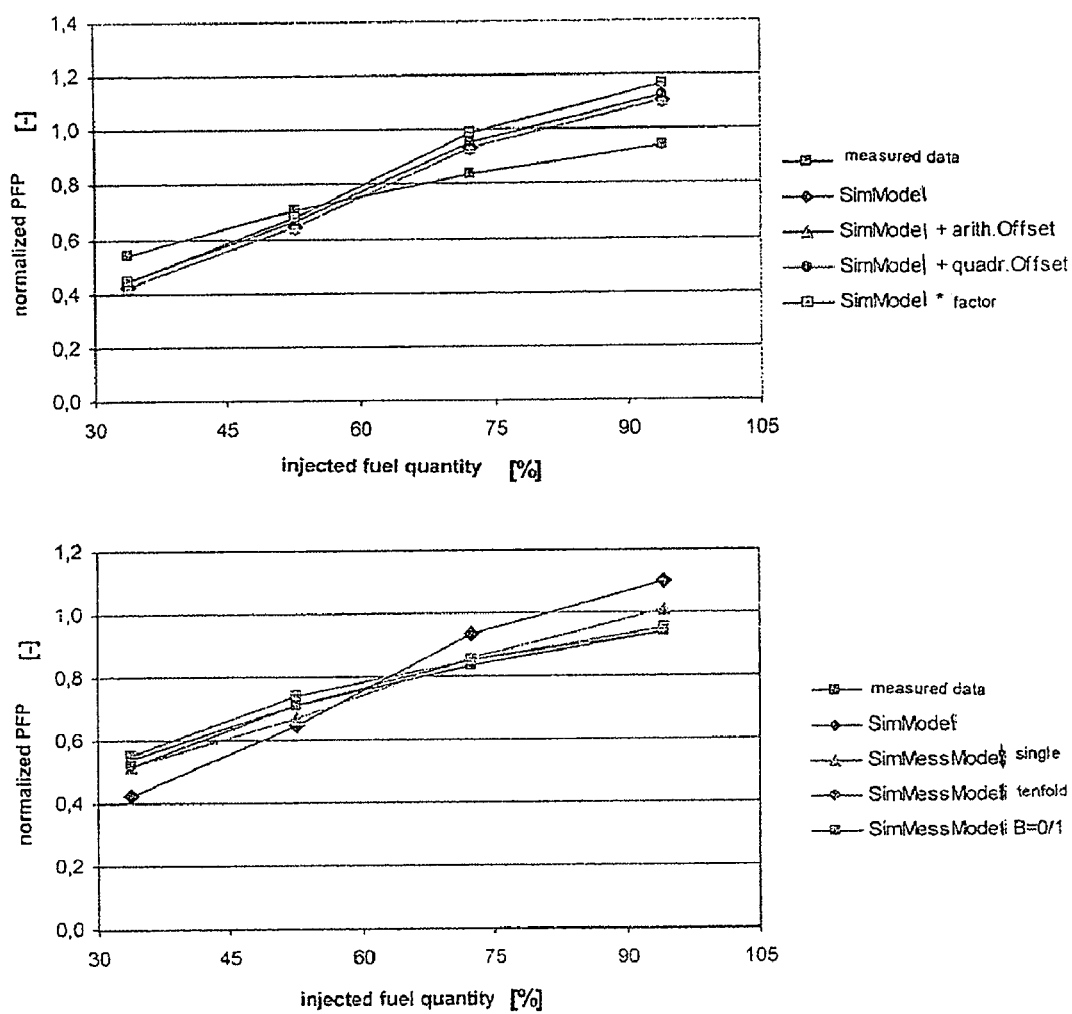

In contrast, the three other ideas have an improvement, the error between measurement and simulation being able to be reduced most effectively with the aid of the block factor again here (FIG. 11, FIG. 12). The tenfold incorporation of the measured data results in better results than the single adding. This may be explained by the higher weighting of the measured points.

The output variable "air-fuel ratio" has a very large error in the simulation at lower load. At the high load points, the model corresponds to the measurements.

Figure 13:
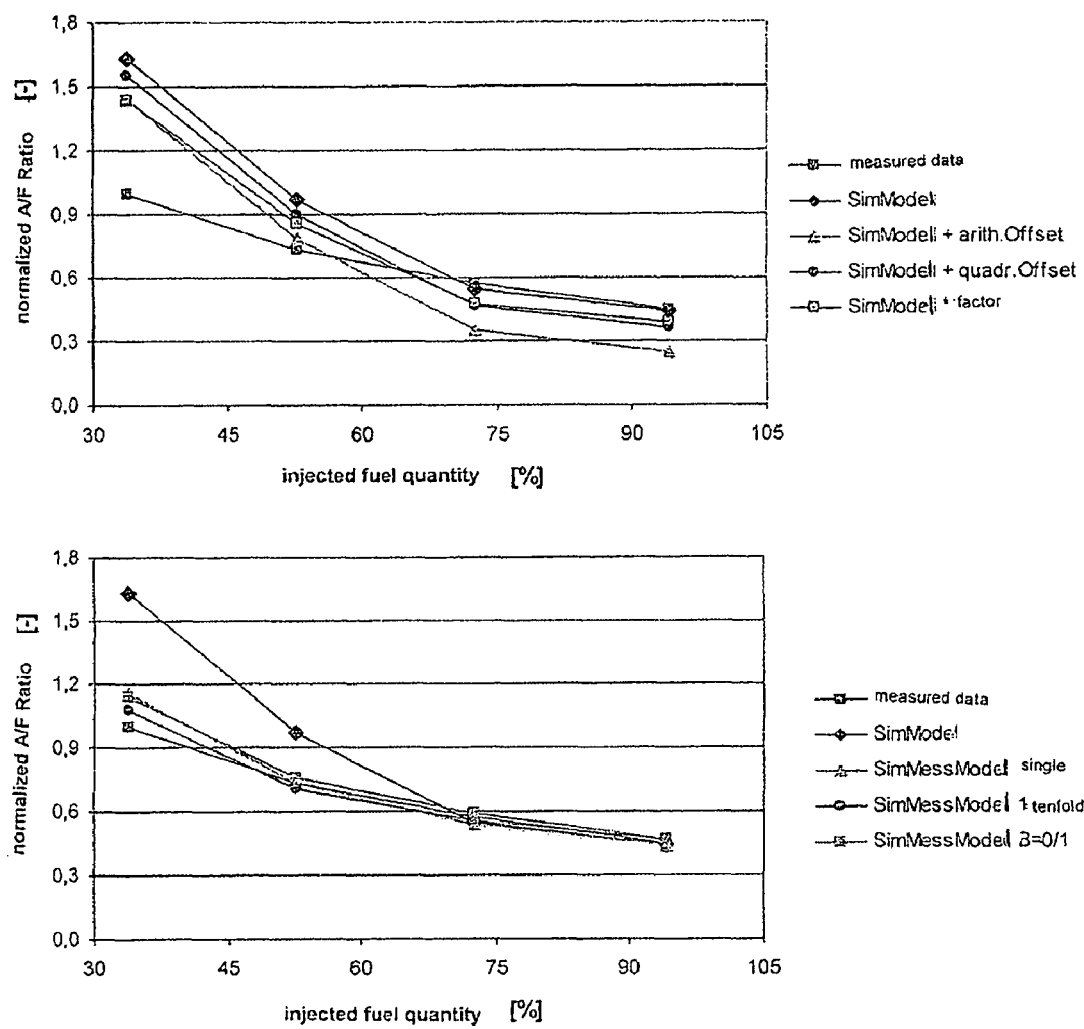
Figure 14:
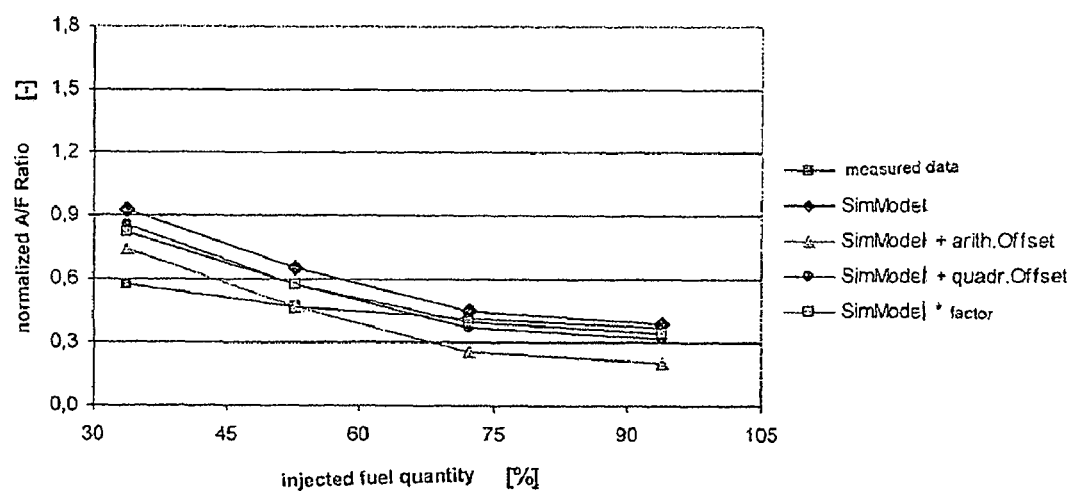
Figure 14:
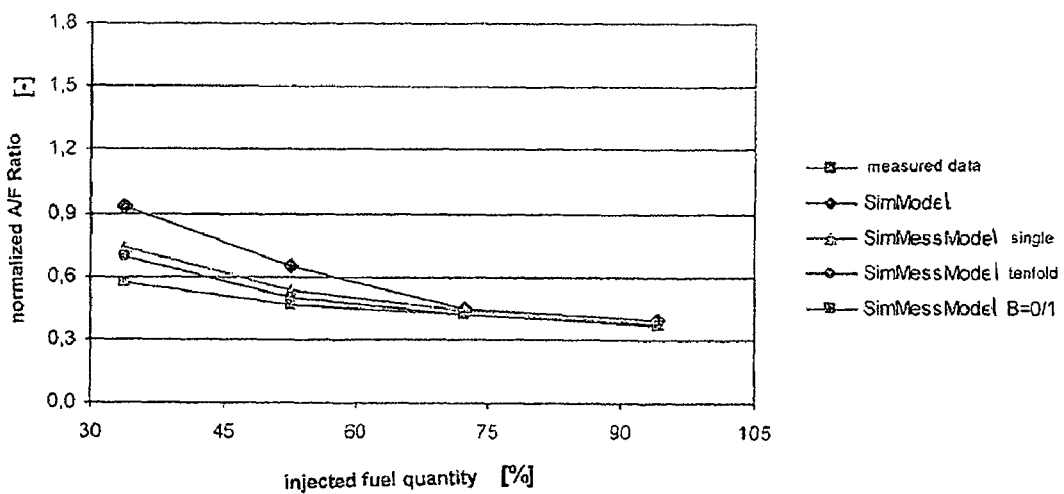

This 63% deviation both in the low-load points without EGR (FIG. 13) and also in those with EGR (FIG. 14) results in a relatively large mean error being calculated, which significantly worsens the model in the full load points (FIG. 13, FIG. 14). Especially the possibility of offset addition, ascertained via the arithmetic mean error, results in the air-fuel ratio decreasing below the stoichiometric air demand at full load, i.e., $\lambda<1$. This results in high consumptions and high emissions in a diesel engine. For this reason, the model compensation using an offset addition is not suitable in this case.

The model calculation by combination of the simulation and measured data before the regression has a very good improvement potential in spite of the large differences in the part load; the full load, which is simulated very well in any case, is hardly influenced, while in contrast the part load is significantly corrected (FIG. 13, FIG. 14). However, it is shown here again that the best results may be achieved by incorporating the block factor. The error is even reduced to zero at the operating points with EGR (FIG. 14).

Figure 15:
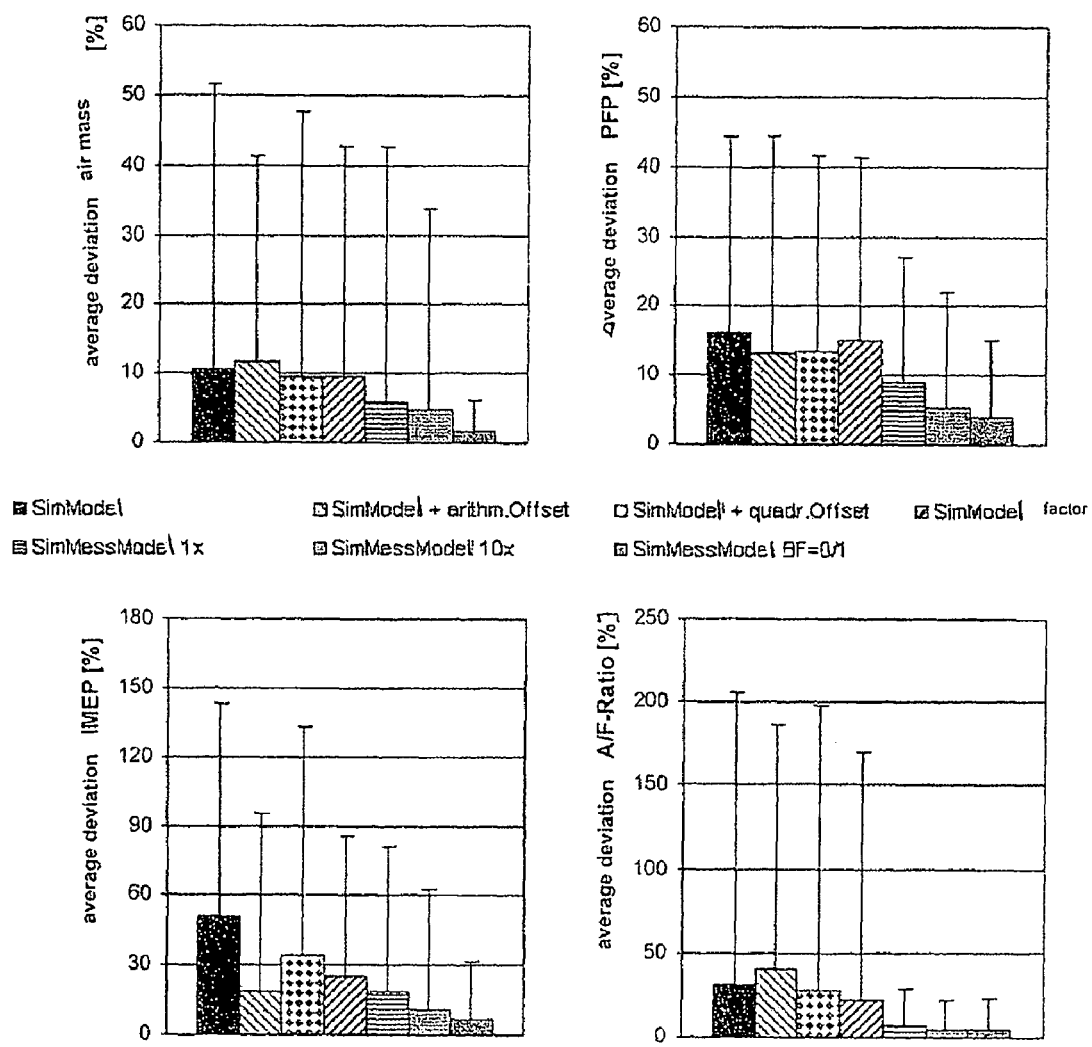
FIG. 15 shows bar graphs which display an evaluation of various methods.

After this detailed description of the individual possibilities, their method of operation, and their effects on the particular model of the various output variables on the basis of a representative speed (2480 rpm), the average error is shown over all of the training data for each output variable in the following block diagrams (FIG. 15). The value of this error is calculated from the sum of absolute values of the deviations divided by the number of the training points (equation 14):

$$\Delta \bar{u} = \frac{1}{n}\sum_{1}^{n} \Delta u_i = \frac{1}{n}\sum_{1}^{n} |u_{Meas} - u_{new}| \tag{14}$$

The different bars each stand for a possible solution (see legend); the black line indicates the "worst case", i.e., the maximum deviation of the particular output variable from the setpoint value (measured value).

The graphs confirm the results up to this point. As may already be seen on the basis of the detailed evaluation, the incorporation of the block factor results in the smallest average deviations: the air mass may be corrected from 11% to an average 2%, there is even a 45% potential improvement in the training data for the indexed mean pressure. The average deviation is also corrected by 12% and 26% for the maximum cylinder pressure and the air-fuel ratio, respectively. The possibility of simple combination of the measured and simulation data also results in good results, the multiple addition of the measured data providing better results here. The three ideas of performing the compensation via an offset allowance and/or factor multiplication display hardly any improvement in the average, sometimes even worsening.

If the maximum deviations (black line) are observed, the scattering after the incorporation of the block factor is also the smallest here. The idea according to the present invention may stand out positively in most cases even in relation to the other two possibilities of a combined simulation-measurement model.

It is clear that the air mass error may be reduced from an average of 11% to at most 7% by the compensation between simulation and measured data using a block factor in the points in which the compensation is performed, from 51% to at most 25% for the indexed mean pressure, from 16% to at most 11% for the maximum cylinder pressure, and from 31% to at most 19% for the air-fuel ratio.

Figure 16:
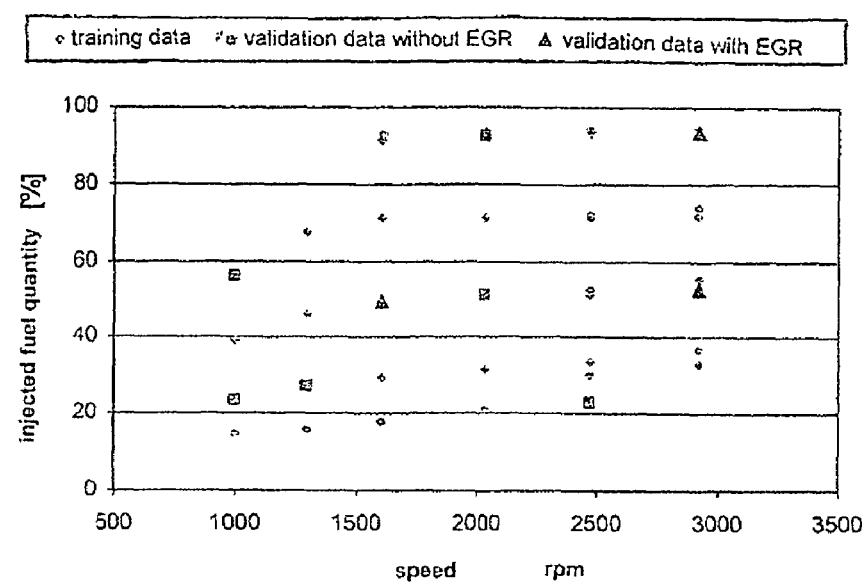
FIG. 16 shows a further graph corresponding to that of FIG. 1 and FIG. 5, in which the measured points used for validation are plotted in the program map.

In order to check these results, which were shown before, nine of the 41 operating points were not used for the model calculation, as noted at the beginning. These points are used for the validation and were selected arbitrarily from the program map (see FIG. 16).

The input variables of these operating points, i.e., the particular speed, injected fuel quantity, boost pressure, etc., were used in the corresponding models for air mass, indexed mean pressure, maximum cylinder pressure, and air-fuel ratio which resulted after performing the individual solution approaches.

Figure 17:
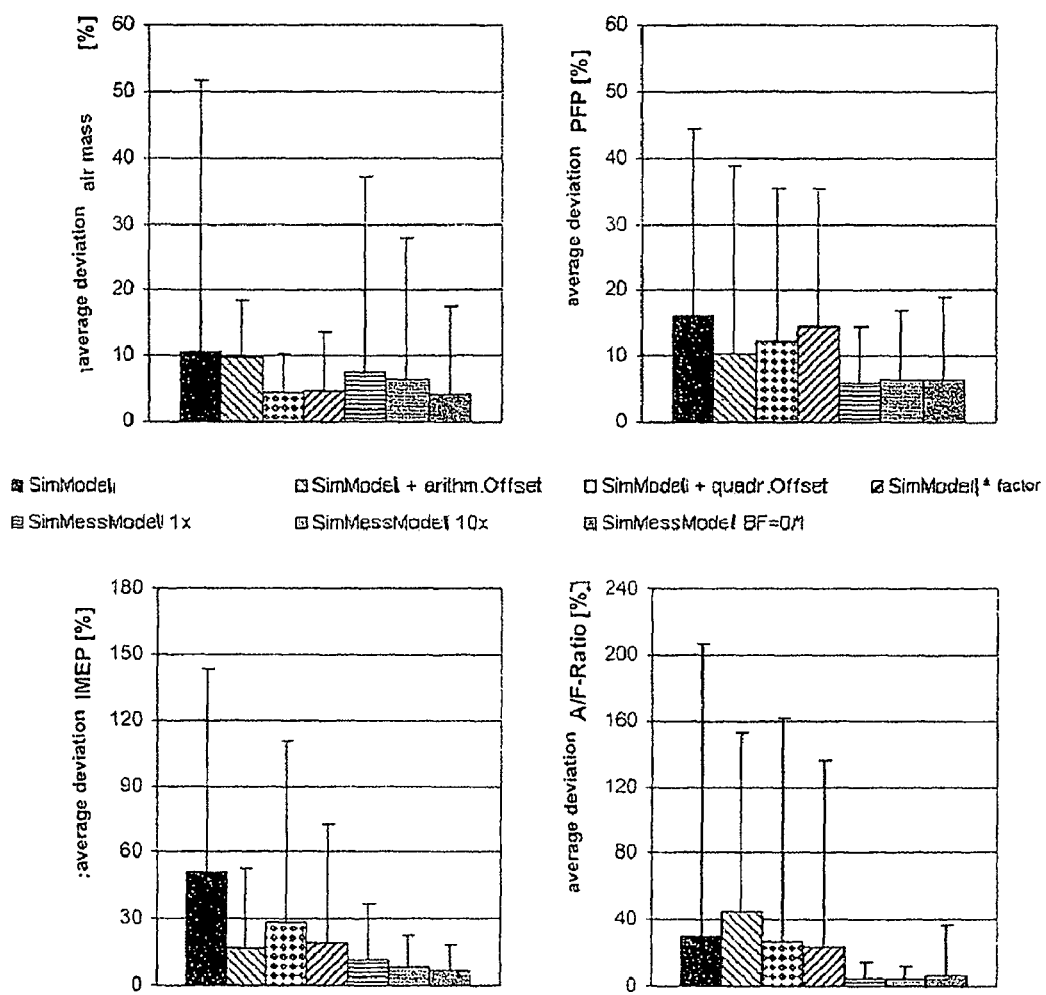
FIG. 17 shows further graphs corresponding to that of FIG. 15.

The average error between actual measured values and the values ascertained for the individual possibilities was also calculated here (equation 14). FIG. 17 represents the associated block diagram in the same way as previously in FIG. 15.

The results of this validation data do not result in any new revelations, although the picture does not come out as clearly as with the training data.

However, the smallest absolute deviations also result here after the incorporation of the block factor, if one observes all four output variables. One may reduce the error of the indexed mean pressure in these nine operating points from an average of 51% to at most 18%, for example.

Contrary to expectation, the errors of the air mass after the offset allowance or after the multiplication by the factor are relatively low. However, this may be because of the selection of the validation data, so that one must assume that the model was randomly corrected well precisely there. No clear improvement was able to be established for the remaining output variables of maximum cylinder pressure, indexed mean pressure, and air-fuel ratio.

Because of the results shown, it may be stated in summary that the measured data compensation with the aid of an offset addition or a factor multiplication is not recommendable. This is because worsening is often obtained in the areas in which the original simulation models were already very good, and hardly any improvement is obtained where the models are very poor. This occurs relatively frequently above all in BOOST simulations, since BOOST has no strengths in the full-load design and up to now has not been designed for simulating the part load. The offset or factor allowance may even result in isolated cases in unrealistic output variables being calculated: in this case, for example, an air-fuel ratio in full load below the stoichiometric air demand was simulated.

Furthermore, it was shown that the curve shapes did not always qualitatively correspond, however, so that therefore an improvement over the program map may not be achieved using a constant value.

The equivalent adding of the measured data to the simulation data, both singly and also in multiples, did show relatively good results. However, this method is questionable, since simulation data having similar input variables is already provided. A double meaning thus results in many model areas, which is difficult to handle in the model calculation. This is also the reason why the improved model is oriented neither to the original simulation value nor to the measured points.

Accordingly, the incorporation of a block factor as a further variation parameter, which is set to one for the measured data and zero for the simulation data, is the most advisable. In this case, the model is equalized to the measured values in the areas where measured points are provided, even when there are large differences to the original simulation model. Where no measurements are provided, e.g., in quasi-transient operating areas, the simulation data are now used and the entire program map is thus not corrupted.

In these methods, it is to be ensured that the measurements are in the variation range of the BOOST calculations, since the models are otherwise skewed.

Furthermore, it is advisable to distribute the measured points well in the experimental space in order to achieve improvement over the entire program map as much as possible.

In the following, the procedure when modeling through partial models is described:

At the beginning, sensitivity analyses are performed to determine which parameters have the greatest influence on the particular output variable. Correction factors may be incorporated or scaling and/or calibration factors, which BOOST provides, may be changed.

Those measured variables which are primarily of interest for the application are used as output variables. These include
inflowing air mass (M_L1),
indexed mean pressure (IMEP),
maximum cylinder pressure (TFT),
exhaust gas temperature before catalytic converter and/or before turbine (TABG), the latter above all because the temperature has a large positional weight in the parameterization of diverse program maps (entry temperature of turbine and/or catalytic converter).

In these sensitivity analyses, it has been shown that the areas of charge cycle, combustion (IMEP & PFP), and exhaust gas may be observed separately and the optimization problem may thus be kept visible.

It is obvious from the above statements that the simulation with the aid of the core model has very great difficulties in simulating the exhaust gas recirculation. Therefore, in this part only the measured points without EGR were used, so that of the 41 available operating points, only 27 data sets were able to be used. These were also divided into 20 training data sets and 7 validation data sets (FIG. 18). The validation data lies arbitrarily in the program map and is used, as in the first section, for the later checking of the method (generalization).

The core model described above is used for the purpose of simulating the measured points in boost. For this purpose, the various input variables are set as a function of the operating point:
speed
injected fuel quantity
boost temperature
boost pressure
exhaust gas counter pressure
air-fuel ratio in the intake
wall temperatures in the combustion chamber
start of injection
ignition lag
combustion duration
VIBE form factor As already described, the first five variables may be adopted from the test stand measurements; the intake-side air-fuel ratio is set to infinity, since no exhaust gas recirculation is provided and therefore no fuel is provided in the intake; the start of injection is ascertained from the data of the control unit (ECU program maps) during the test stand measurement.

The general optimization sequence is identical for all four output variables:

After the main influence parameter for the corresponding variable has been determined on the basis of the sensitivity analyses, there is a full factorial variation of this variable for each training point with the aid of BOOST. Multiple solutions are thus obtained for each operating point as a function of the selected parameter. It is to be ensured that the desired setpoint value may be reached by setting the factor. If this is not the case, either the variation range must be enlarged or another influence variable must be found which results in the required setpoint values.

In a next step, the BOOST results are imported into the model in order to ascertain the exact parameter setting therein, so that the setpoint value is reached. The target function to be defined in the model results from the requirement that the delta between actual value and setpoint value is to be minimized as follows:

$$\text{TargetFun} = |\text{actual value} - \text{setpoint value}| = |u_{Boost} - u_{Meas}| = \min \quad (15)$$

in which:

$u_{Boost}$ simulated output variable, varied by parameter $u_{Meas}$ measured value (setpoint value for the corresponding operating point)

This target function is modeled using the modeling algorithm "ModelFormula" described above and simulated exactly. However, the requirement for this purpose is that the corresponding output variable is also simulated at a high model quality. For this purpose, either a polynomial regression model or a neuronal network is used, depending on which provides the better model quality.

The actual parameter ascertainment is performed subsequently by a local optimization of all operating points (training data). The minimum of the absolute value function from equation 15 is ascertained with the aid of an optimization algorithm selected beforehand. The actual value and the setpoint value of the particular output variable correspond where the absolute value function is equal to zero.

The parameter setting is thus ascertained for every operating point of the training data, so that the corresponding output variable may be simulated as exactly as possible.

In order to check whether this method also applies for other areas of the program map and thus transferability is also provided for in application, as already noted, seven validation data sets were not incorporated in the optimization sequence. The general validity of the optimization results is tested on the basis of these operating points.

For this purpose, in a first step, a transfer of the parameters found from the few support points of the training data to the entire program map as a function of speed and injected fuel quantity is made possible. Two possibilities were analyzed.

Model calculation: a model may be laid through the optimum setting parameters with the aid of simulation programs. This model is based on a mathematical formula which links the particular factor to the input variables of speed and injected fuel quantity.

Linear interpolation: an interpolation is performed between the individual support points, so that the intermediate values are calculated via a linear relationship between the particular neighboring points.

Both parameters are used for the purpose of allowing a transfer of the optimized parameters and thus an improvement of the simulation model over the entire program map.

The results of the overall optimization sequence are documented in the following in three sections: charge cycle, combustion, and exhaust gas. The sequence of the descriptions corresponds to the procedure when compensating for the model using this method, since the different variation parameters partially have an influence on the other output variables. For this reason, the sequence may not be changed arbitrarily.

Charge Cycle

The delta between measurement and simulation, plotted over the training points ordered according to speed and load, is shown in FIG. 19. A tendency may be recognized: at moderate speeds, too little inflowing air is simulated.

This air expenditure, which is actually higher, is explained by the dynamic pressure pulsations in the intake system during a working cycle, which cannot be simulated in the core model. These are currently consciously used when developing modern internal combustion engines in order to increase the fill level.

In order to compensate for this disadvantage of the core model, the pressure gradient over the engine must be adapted in such a way that more or less air arrives in the engine depending on the operating point.

The first idea comprises influencing the air mass by throttling in the intake and exhaust systems. For this purpose, the flow coefficients in the restrictions of the BOOST model were changed. Flow coefficients scale the flow area and may be set at each transfer point in the pipe system, in this case for the intake-side throttling at the outlet of the plenum (PL1, FIG. 5) and for the outlet-side throttling at the node point J1. If these two parameters are varied, a variation of the air mass is obtained. The ratio of simulated air mass to the measured air mass is plotted over the flow coefficients for an operating point in FIG. 20 (setpoint value=1).

It may be seen that one has an influence on the air mass, but the inflowing air may not be increased. For this reason, throttling is not suitable for this type of application.

Figure 21:
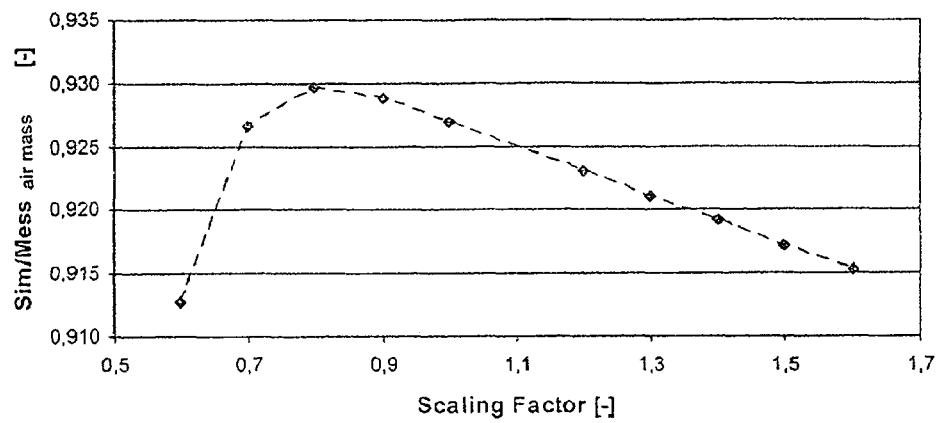

In the second analyzed possibility, a variation of the scaling factor of the intake valve in the cylinder element was performed. With the aid of the scaling factor, the effective flow area of the valve is scaled and thus the inflowing air is changed. However, it is obvious that the predefined setpoint value may also not be reached using this possibility (FIG. 21). In addition, the influence on the air mass is not nearly large enough; it may be changed by at most 2% in the operating point shown here, for example.

Figure 22:
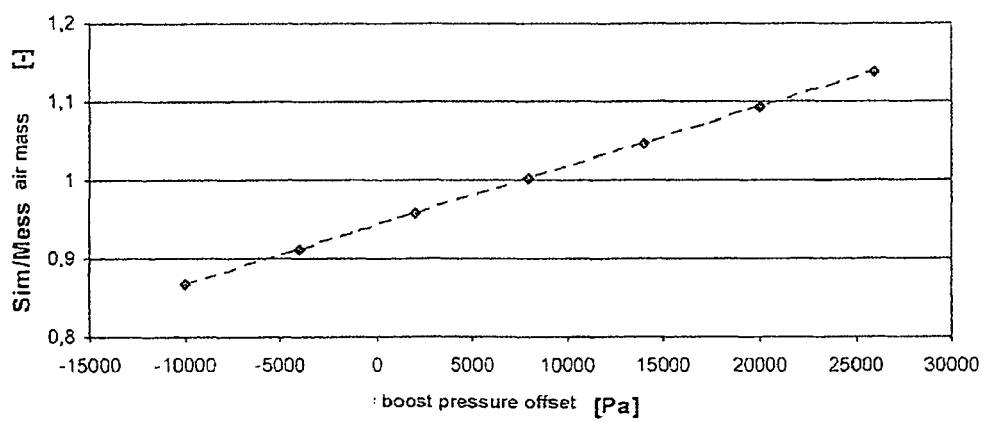

The third and finally most effective possibility is based on the idea of directly changing the pressure gradient over the engine by adding an offset to the boost pressure. This is because an increased fill level is achieved by increasing the boost pressure at uniform exhaust counter pressure. In contrast, a reduction of the boost pressure causes less air to arrive in the engine. The graph in FIG. 22 shows a variation of the offset. It may be seen that the air mass may be set to its setpoint value by this method.

Therefore, a full factorial variation of the boost pressure offset between −100 mbar and +250 mbar is performed to optimize the charge cycle, and subsequently the required pressure compensation to achieve the desired air mass is ascertained via the method described above.

Figures 23, 24:
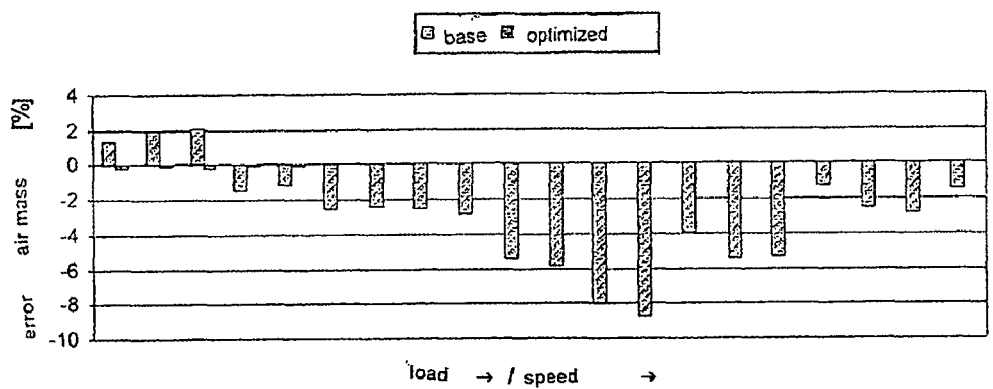
FIG. 23 shows a table to illustrate optimization results.
FIG. 24 shows a bar graph which represents the percent error of the air mass in training points before and after optimization.

The results which result after the optimization are shown in FIG. 23. For every operating point (left column), an optimum boost pressure offset (middle column) is ascertained, so that the delta between actual value and setpoint value results as zero as much as possible. In this case, the optimization may be performed ideally (right column: error=0.000).

If this boost pressure offset is verified by another simulation in BOOST, the desired air mass is obtained in nearly all 20 training points. The percent error before adding the offset is shown once again crosshatched in light gray in FIG. 24; the dark gray bars show the slight deviations from the setpoint value after the offset addition.

However, there is still a slight error present while the optimizer maintains that the error is zero (FIG. 23). This is because models which still represent an approximation are accessed during the optimization. However, it is often not possible to improve the model quality in such a way that reality is simulated 100% correctly.

Two methods may be used for the validation, i.e., the transfer to the remaining seven other operating points: model calculation and interpolation.

Figure 25:
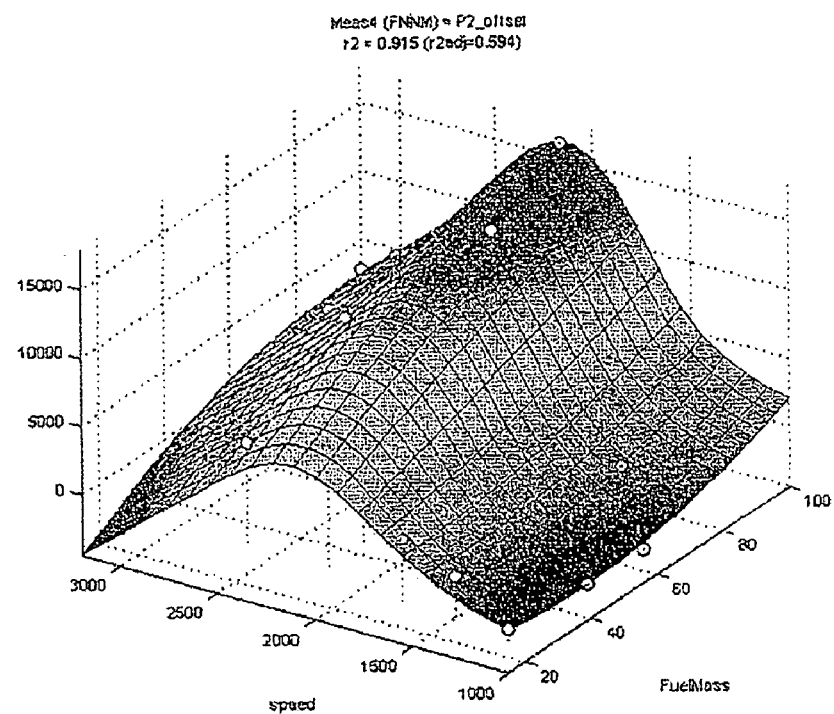
FIG. 25 shows a graph which explains the boost pressure offset model.

The model which is laid over the boost pressure offset as a function of speed and injected fuel quantity (see FIG. 25) reflects the disadvantage of the core model very well, namely that with this experimental substrate the boost pressure must be increased at moderate speed so that the actual air mass may be simulated.

In order to obtain the most precise possible statement about what lies between the support points, the model must be modeled at the highest possible quality. For this purpose, in this case the method of neuronal networks is used and a very good certainty dimension of $R^2=0.915$ is obtained.

Figure 26:
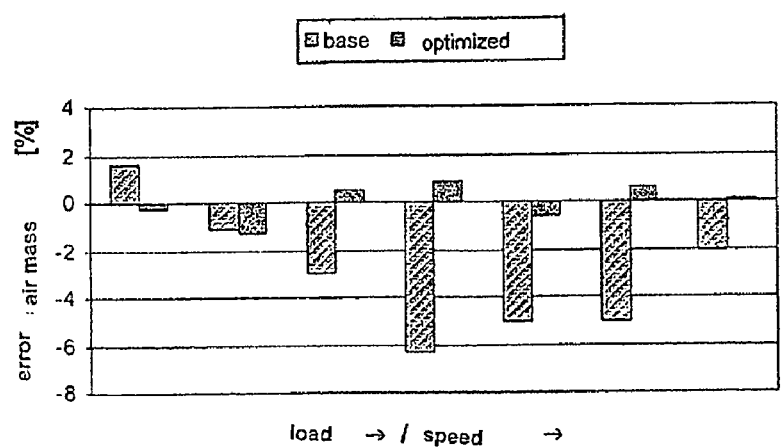
FIG. 26 shows a further bar graph to illustrate the percent deviation of the air mass in the validation points.

If the corresponding offset for the 7 validation points is determined from the model and the air mass is calculated with the aid of BOOST, the results show that a transfer to these points is possible. FIG. 26 presents the percent deviation for this purpose before (crosshatched in light gray) and after (in dark gray) the optimization: the air mass error may be reduced from 6% to just over 1%.

Figure 27:
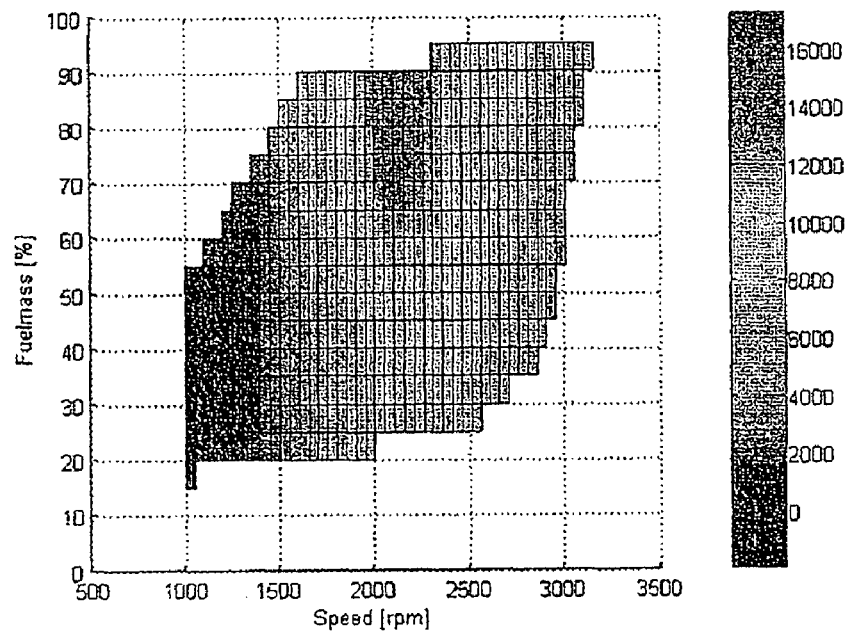
FIG. 27 shows a program map of the boost pressure offset.

The second possibility of the transfer by interpolation over the entire program map has the advantage that the program map ascertained therefrom simulates the support points precisely and is not corrupted by modeling. This program map for the boost pressure offset is shown in FIG. 27. It also shows the increased boost pressure in the range of moderate speeds and high loads.

Figure 28:
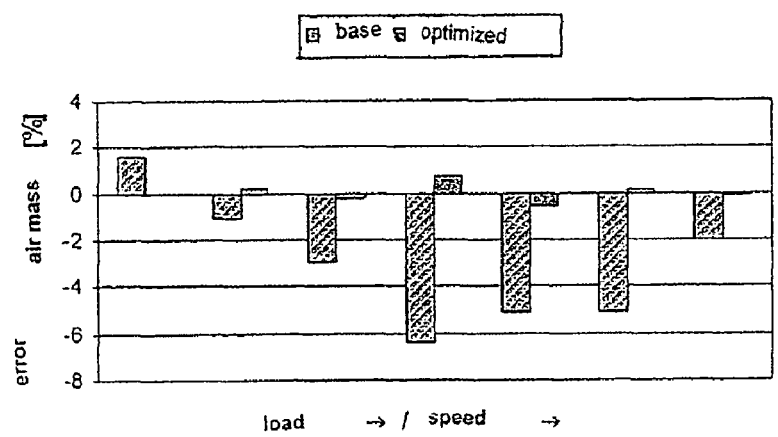
FIG. 28 shows a bar graph which displays the percent deviation of the air mass in the validation points after the transfer by interpolation.

The simulation having the pressure allowances resulting therefrom show even better results: the error is even reduced from 6% to at most 0.8% (FIG. 28).

Basically, it may be stated that very good improvement of the simulated air mass may be achieved over the entire program map using this methodology.

Combustion

Optimizing the combustion means equalizing the starting variables IMEP (indexed mean pressure) and PPF (maximum cylinder pressure) to the particular measured values.

Figure 29:
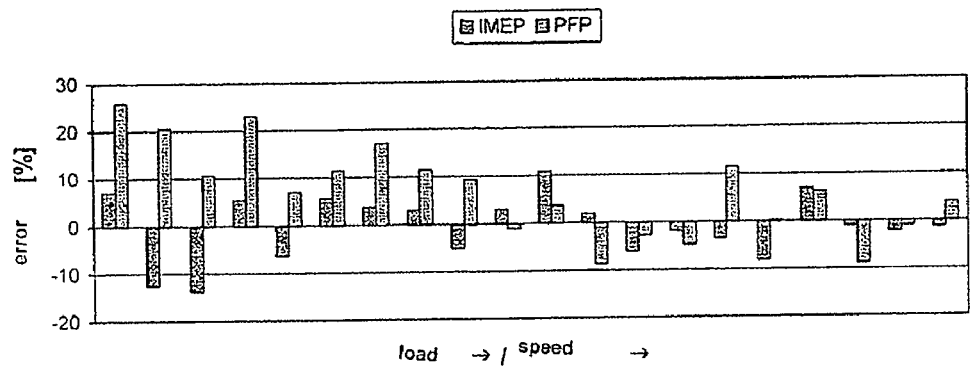
FIG. 29 shows a bar graph which displays the percent error of the combustion variables IMEP and PFP.

If the difference between the measured and simulated variables in the program map (FIG. 29) is observed, no clear tendencies are recognizable. For this reason, the selection of the parameter for the calibration of the simulation model is not clear.

Since few details are known about the internal engine conditions in the early development phase, it is more advisable to use a simple combustion model. The VIBE combustion function comes into consideration for this purpose, for example. The combustion duration, start of combustion, and the VIBE form factor must be specified for the parameterization.

Firstly, a full factorial variation of all three parameters is performed, so that the indexed mean pressure and the maximum cylinder pressure may be adapted simultaneously with the aid of this target function:

$$1000 \cdot \frac{|IMEP_{Boost} - IMEP_{Meas}|}{IMEP_{Meas}} + 100 \cdot \frac{|PFP_{Boost} - PFP_{Meas}|}{PFP_{Meas}} + \frac{|TABG_{Boost} - TABG_{Meas}|}{TABG_{Meas}} = \min \quad (16)$$

Special weighting is placed on IMEP in this case by the selection of the factors, since this variable is to be reproduced as precisely as possible. The exhaust gas temperature is incorporated in this target function so that in the event of two optima, the optimum whose exhaust gas temperature is closer to the measured value is selected.

Figure 30:
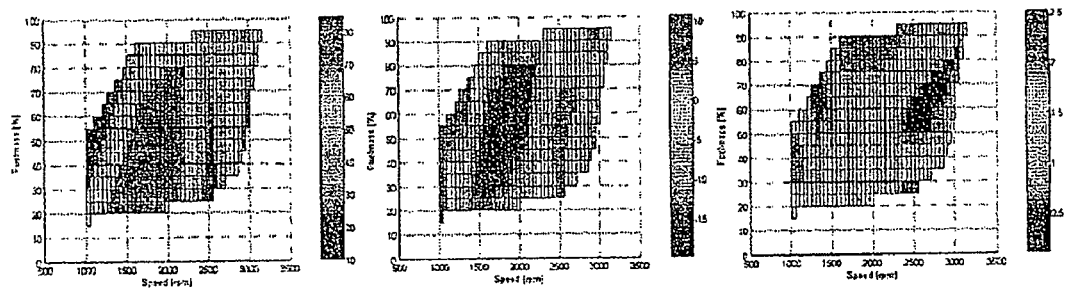
FIG. 30 shows program maps for the combustion duration, the start of combustion, and the form factor ascertained by interpolation, plotted over speed and load.

However, it has been shown that the optimization problem has too many degrees of freedom and therefore may not be solved uniquely (no reproducible and robust optimum). Furthermore, it has not been possible to lay a fitting program map over the ascertained parameters, since the values oscillate too strongly and no clear tendencies were recognizable. FIG. 30 shows the program maps of the combustion duration, the start of combustion, and the form factor which resulted after the optimization.

On the basis of the scaling, it is clear that the individual parameters oscillate very strongly as a function of speed and load and very large gradients between the individual support points thus arise. Improvement over the entire program map may therefore not be made possible using this method.

Therefore, it is necessary to split the optimization sequence into two parts, by first adapting the maximum cylinder pressure and then reducing the delta between measured and simulated IMEP. If possible, only one variation parameter is to be available for each output variable. For this reason, a part of the parameters must be set constant.

Since the start of injection is known from the ECU program map, it is advisable to fix the start of combustion. The ignition lag, which describes the time between start of injection and actual start of combustion, is estimated, so that it increases with rising load and rising speed:

$$SOC = SOI + ZV = SOI + a*n + b*m_B + c*n*m_B + d \quad (17)$$

The VIBE form factor may be modeled in the same way, since the combustion curve of a diesel becomes "softer" the higher the speed (combustion focus shifts "later"):

$$m_{Vibe} = e*n + f \quad (18)$$

The factors a through d were approximated in this case on the basis of the measured data; e and f were determined in such a way that the form factor resulted in the value 0.2 at lower speed and the value 0.7 at higher speed.

Figure 31:
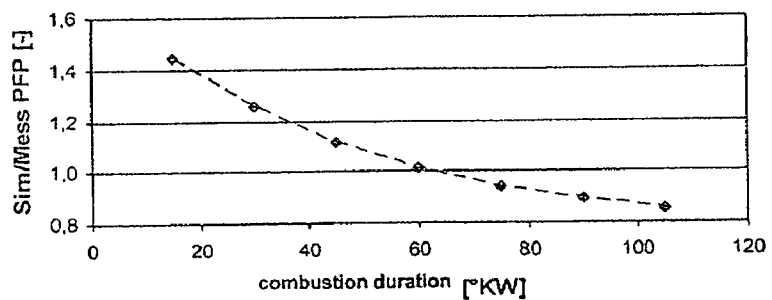
FIG. 31 shows a graph which displays the variation of the combustion duration in an operating point.

The three-dimensional problem may be reduced to only one free parameter by the approximation: the combustion duration. There is no information about the combustion duration in a simple test stand measurement. Therefore, it is advisable to vary the combustion duration in a full factorial way. As FIG. 31 shows, this parameter has a large influence on the maximum cylinder pressure, so that the setpoint pressure may be set in this way.

Figures 32, 33:
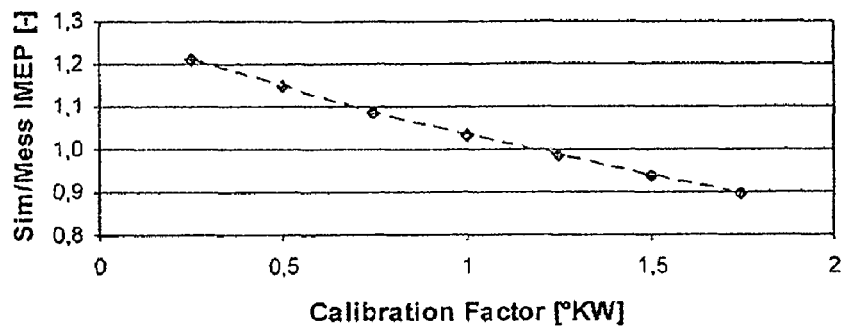
FIG. 32 shows a graph which displays the variation of the heat transfer calibration factor in an operating point.
FIG. 33 shows a table which represents the optimization results for transferring the combustion duration.

After the combustion duration is ascertained and thus the maximum cylinder pressure is equalized, the indexed mean pressure must be adapted to the measured value. This may be performed by changing the heat transfer. This is because the heat loss during the combustion has an almost linear influence on the output variable IMEP (FIG. 32). The heat loss is scaled via the calibration factor in BOOST and IMEP is thus equalized to the measured value.

The equalizing of the maximum cylinder pressure over the combustion duration results in very good results in the individual operating points. FIG. 33 shows the associated screenshot of the optimization results. A slight difference remains in many points, which is caused by the selection of the termination criterion of the optimization algorithm. However, this minimal error is not relevant for the simulation in BOOST.

Figures 34, 35:
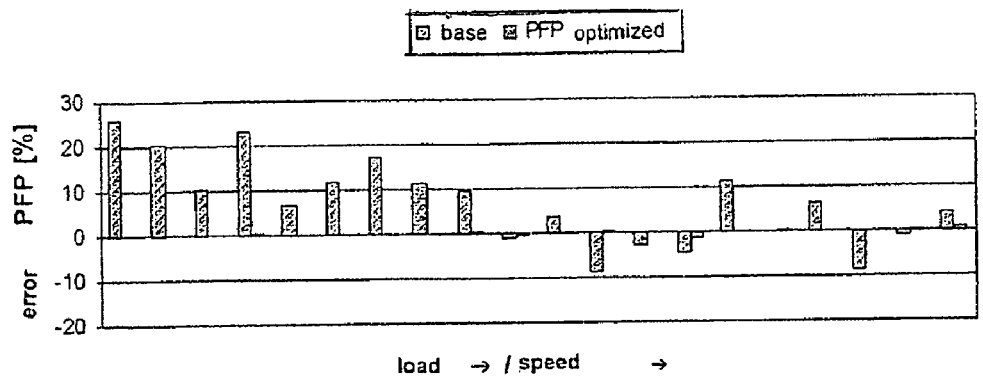
FIG. 34 shows a bar graph which displays the percent error of the maximum cylinder pressure in the training points before and after the optimization.
FIG. 35 shows a table which represents the optimization results for ascertaining the calibration factor.

This is because the associated BOOST simulations have a reduction of the percent error between measured and calculated PFP which is at most 1.5% after the equalization (see FIG. 34).

Figures 36, 37:
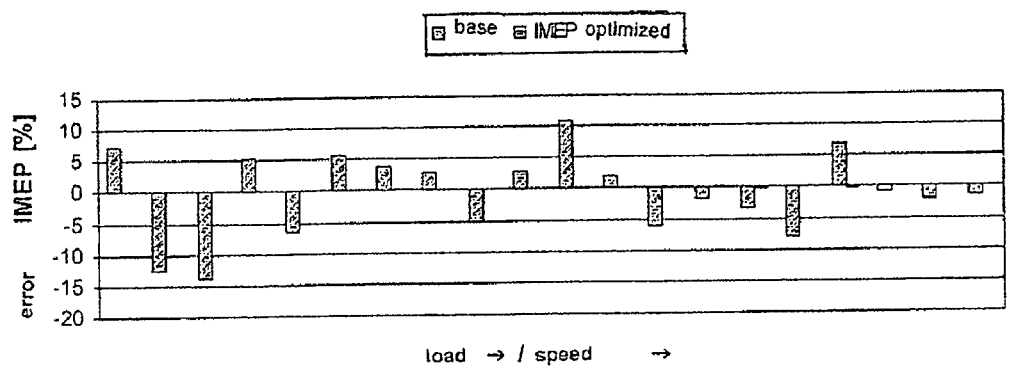
FIG. 36 shows a bar graph which displays the percent error of the indexed mean pressure in the training points before and after the optimization.
FIG. 37 shows a graph which represents the combustion duration model (FFN)

The results which result from the adaptation of the indexed mean pressure also show similar results (FIG. 35, FIG. 36). The deviation of the simulated IMEP in relation to the measured value may even be reduced to less than 0.2% in these training points. This represents a significant improvement of the simulation of this output variable.

Overall, it may be stated that it is possible to equalize the combustion variables of maximum cylinder pressure and indexed mean pressure to the particular measured data via the two parameters of combustion duration and calibration factor, and in the operating points using which the optimization was performed.

In the following, two possibilities are again listed for transfer of the optimized parameters over the entire program map.

Figure 38:
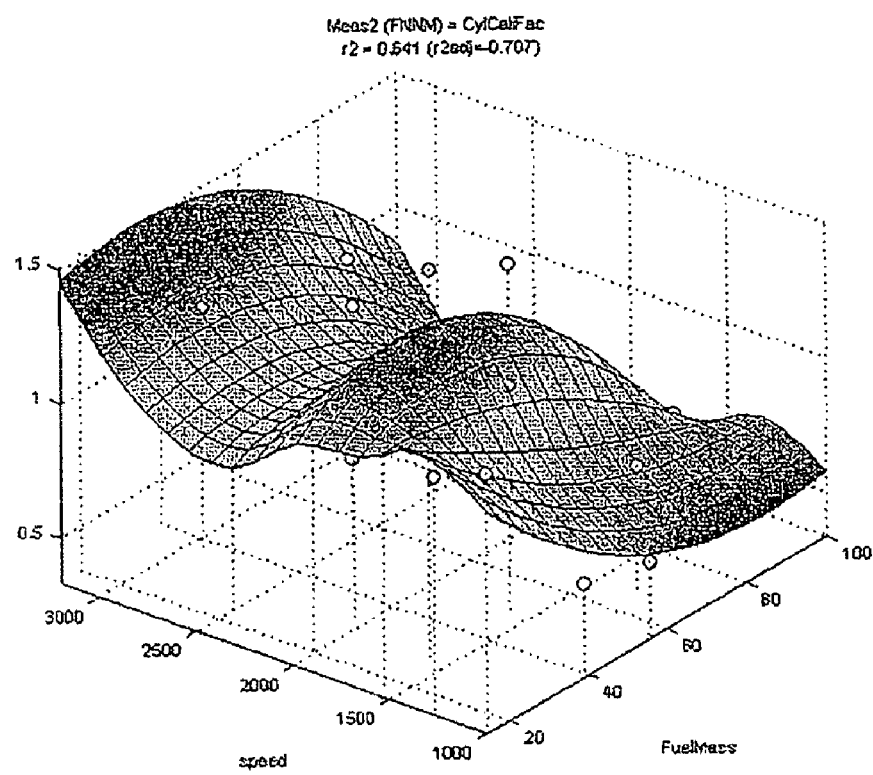
FIG. 38 shows a graph which describes the calibration factor model (FFN)
Figure 39:
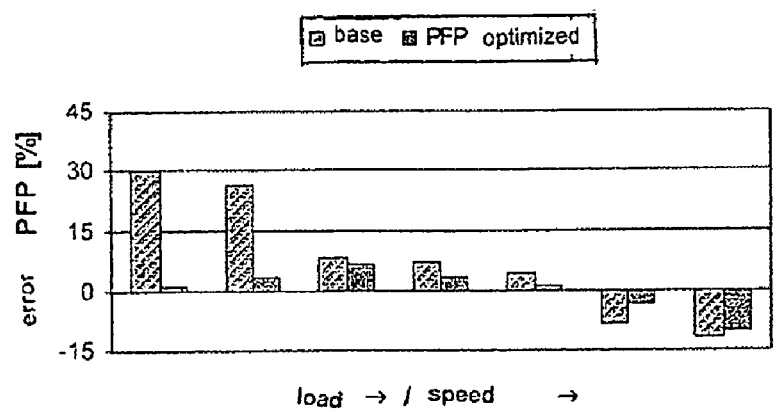
FIG. 39 shows a bar graph which displays the percent deviation of the maximum cylinder pressure in the validation points.
Figure 40:
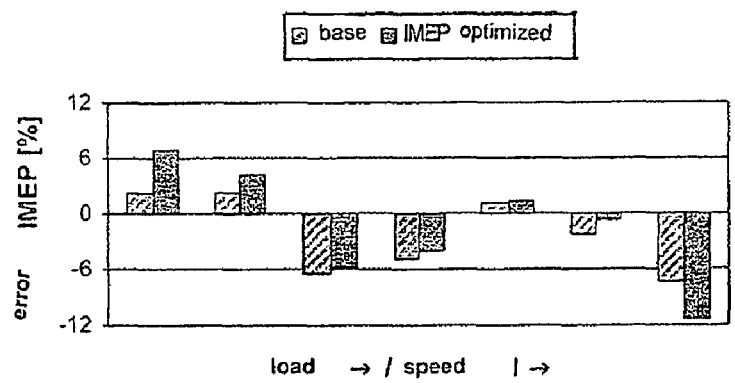
FIG. 40 shows a bar graph which displays the percent deviation of the indexed mean pressure in the validation points.

Firstly, a model is laid through the parameters using the input variables speed and injected fuel quantity. The model of the combustion duration is shown in FIG. 37, produced with the aid of neuronal networks, in order to thus obtain the best possible model quality. FIG. 38 shows the model for the calibration factor, also calculated using the FNN method. In both cases, the model quality has flaws ($R^2=0.825$ and $R^2=0.641$). Precisely in the model of the calibration factor, there is a large difference between the model surface and the actual parameter values. Therefore, no clear tendency for optimizing the indexed mean pressure may be recognized. In contrast, a better model results for the combustion duration, the support points also not being able to be simulated precisely here, however. Nonetheless, the combustion duration may be ascertained for the seven validation points using this model. The associated BOOST calculations show that an improvement of the maximum cylinder pressure is possible, if only by a few percent (FIG. 39).

These results may not be transferred so well in regard to the second combustion variable, IMEP, however: if one simulates the indexed mean pressure in the validation points using the calibration factor ascertained from the model, an improvement only results in a few points, but usually there is an increase of the error between measured and simulated IMEP (FIG. 30).

Figure 41:
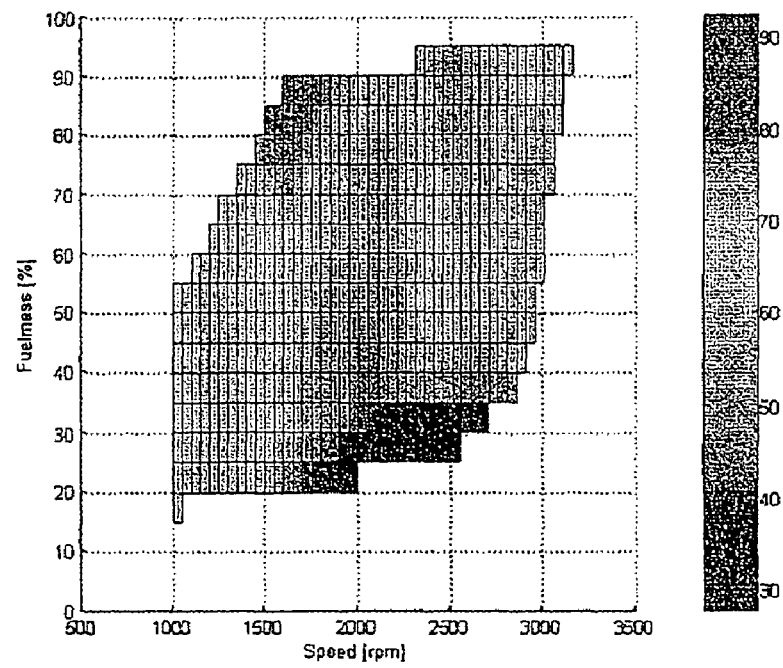
FIG. 41 shows a graph which displays a program map of the combustion duration.
Figure 42:
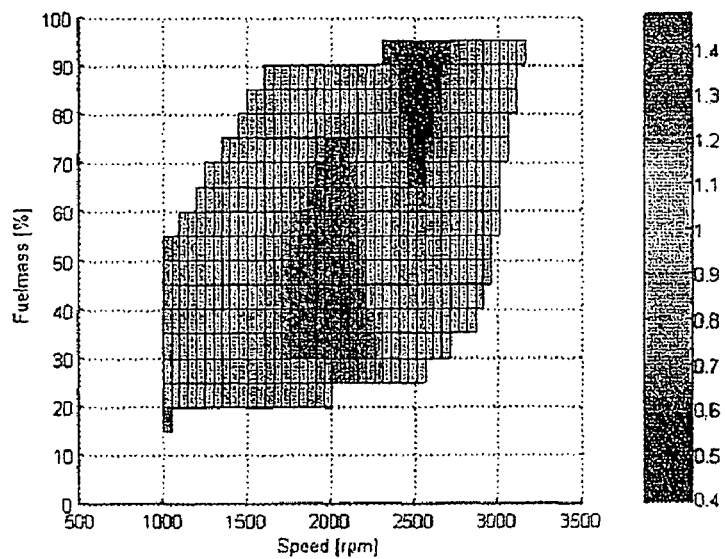
FIG. 42 shows a graph which displays a program map of the calibration factor.

If one performs the second variation of the transfer over the entire program map, namely the linear interpolation between individual support points, the following program maps result for the combustion duration (FIG. 41) and the calibration factor (FIG. 42). The strong gradients between the individual support points may also be recognized very clearly here. This is especially clear in the calibration factor.

It may also be stated that the behavior of the combustion duration over speed and load in this program map looks different than in the model described above (FIG. 37): while the FNN model describes two wave peaks at constant load, the waves in the interpolation program map run at constant speed. This indicates that the model quality of the FNN is not sufficiently good, as expected, and cannot simulate "reality".

Figure 43:
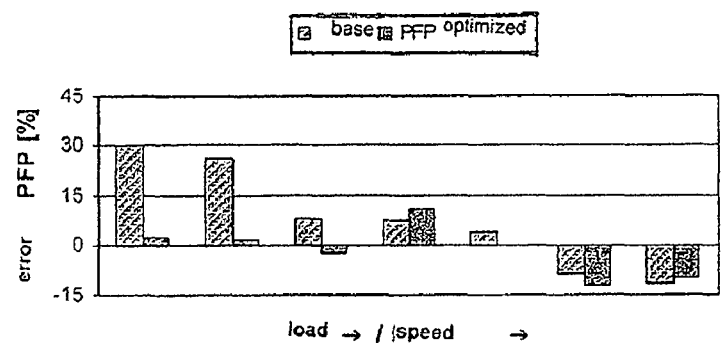
FIG. 43 shows a bar graph which displays the percent deviation of the maximum cylinder pressure in the validation points.
Figure 44:
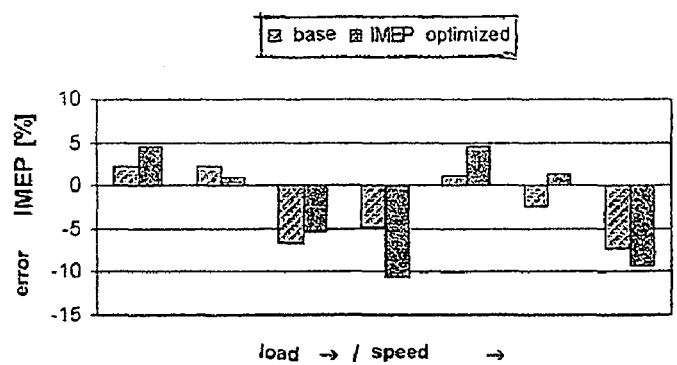
FIG. 44 shows a bar graph which displays the percent deviation of the indexed mean pressure in the validation points.

The percent deviations for the maximum cylinder pressure and the indexed mean pressure in the validation points are illustrated in FIGS. 43 and 44, after the particular combustion duration and the particular calibration factor have been ascertained: contrary to expectations, the interpolation method resulted in worse results in spite of its precise simulation of the parameters. While an improvement of the maximum cylinder pressure in all seven validation points resulted for the first transfer variation, the output variable worsened in this method in some operating points (FIG. 43). Viewed absolutely, however, the error range may also be reduced from 30% to at most 12% here.

In regard to the indexed mean pressure, the interpolation also results in worsening in many operating points, precisely like the model calculation (FIG. 44).

The results shown here indicate that it is possible to optimize individual operating points directly in regard to the combustion variables. However, transfer to the entire program map is not possible, since it may only result in an improvement of the output variable coincidentally. This is because although the model calculation does not represent the correct relationships of the parameters, the transfer partially leads to better results. This may only be coincidence and is thus also a function of the selection of the validation points.

Figure 45:
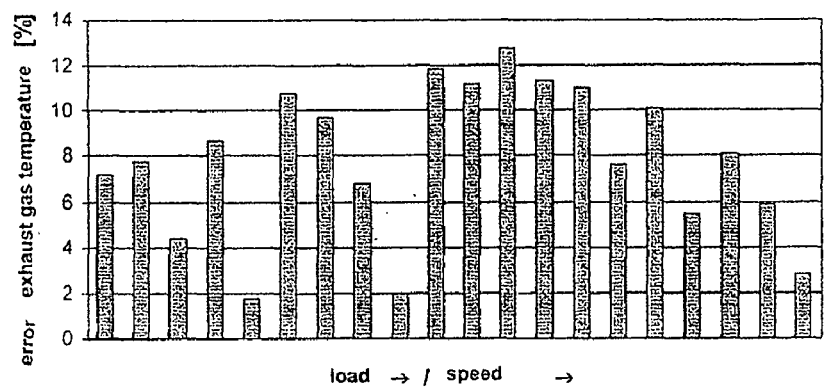
FIG. 45 shows a bar graph which displays the percent error of the exhaust gas temperature in the output base.

The exhaust gas temperature is adapted as the fourth output variable. If one observes the difference between measured and simulated temperatures in FIG. 45, it may be seen that the exhaust gas is simulated too hot in all operating points. For this experimental substrate, this may be explained essentially in that no calculation of the heat loss in the pipes of the exhaust gas system was performed in the simulation. A further explanation would be a different position of the measuring point, for example.

In order to compensate for this deviation, the wall heat flow in the exhaust gas system must be increased. This may be set via the heat transfer factor in the pipes of the BOOST model. It is important that the wall temperature is lower than the measured exhaust gas temperature, i.e., below the setpoint value. Cooling of the exhaust gas may only be implemented under this condition. In this case, the wall temperature was set to a constant 300 K, so that the temperature difference between exhaust gas and wall remains large and therefore the heat loss may be influenced as well as possible.

Figure 46:
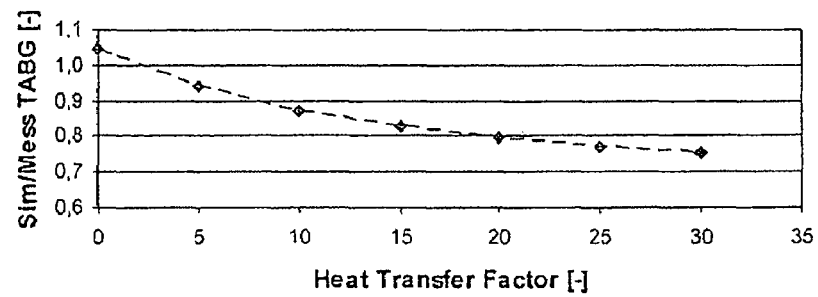
FIG. 46 shows a graph which displays the variation of the heat transfer factor.

In FIG. 46, the ratio of the simulated to the measured exhaust gas temperature after a continuous increase of the heat transfer factor is plotted. It may be seen that it is possible in this way to equalize the output variable to its measured value.

Figures 47, 48:
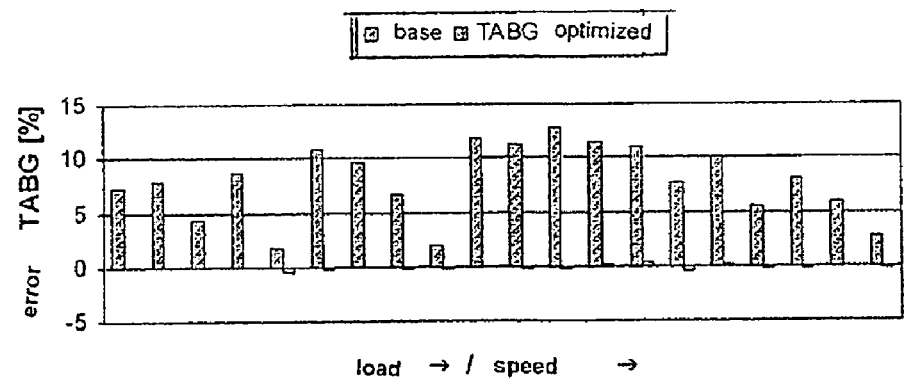
FIG. 47 shows a table which displays the optimization results for ascertaining the heat transfer factor.
FIG. 48 shows a bar graph which displays the percent error of the exhaust gas temperature in the training points before and after the optimization.

The full factorial variation of the heat transfer factor in BOOST and the subsequent minimization of the absolute value function (equation 15) results in the results shown in FIG. 47. The target function is also optimized successfully to zero in all operating points here and an appropriate heat transfer factor is ascertained in each case.

The verification of these results by simulation in BOOST provides the percent deviations presented in FIG. 48, i.e., an optimum improvement of the exhaust gas temperature throughout all 20 training points.

The validation, i.e., the transfer over the entire program map, shows satisfactory results in regard to the exhaust gas temperature.

Figure 49:
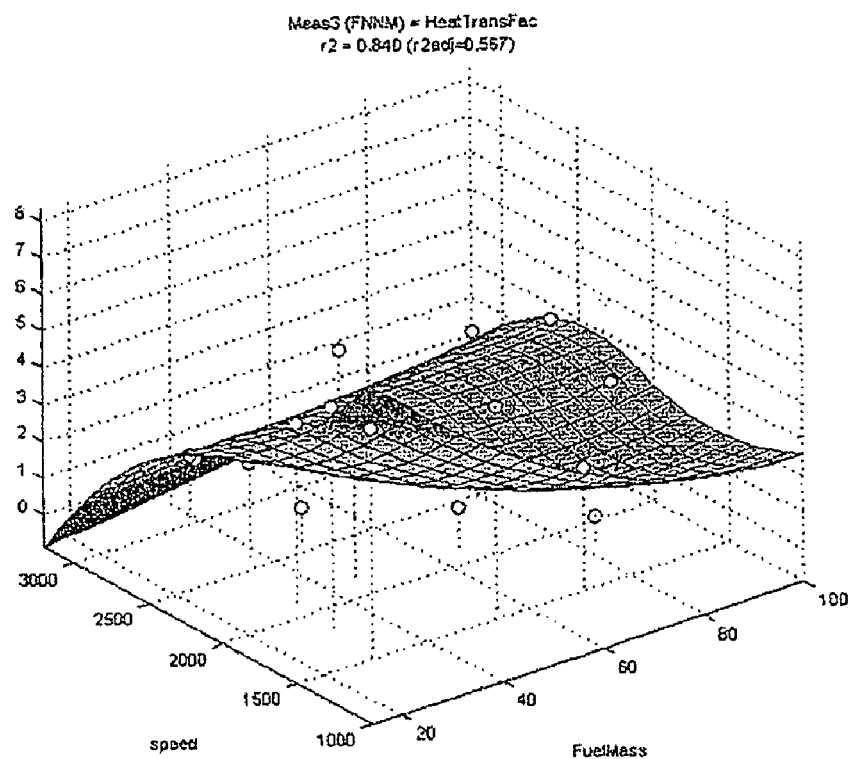
FIG. 49 shows a graph which explains the heat transfer factor model (FFN)

The FNN model of the heat transfer factor (FIG. 49) has sufficiently good quality ($R^2=0.840$).

Figure 50:
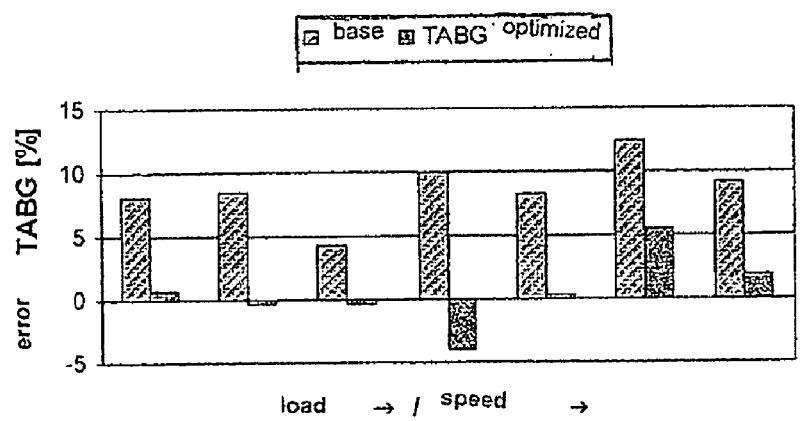
FIG. 50 shows a bar graph which displays the percent deviation of the exhaust gas temperature in the validation points.

The associated boost simulations also result in a correction of the error in the validation points from at most 13% to now nearly 6% (FIG. 50). Furthermore, it may be stated that an improvement of the exhaust gas temperature occurs in all points.

Figure 51:
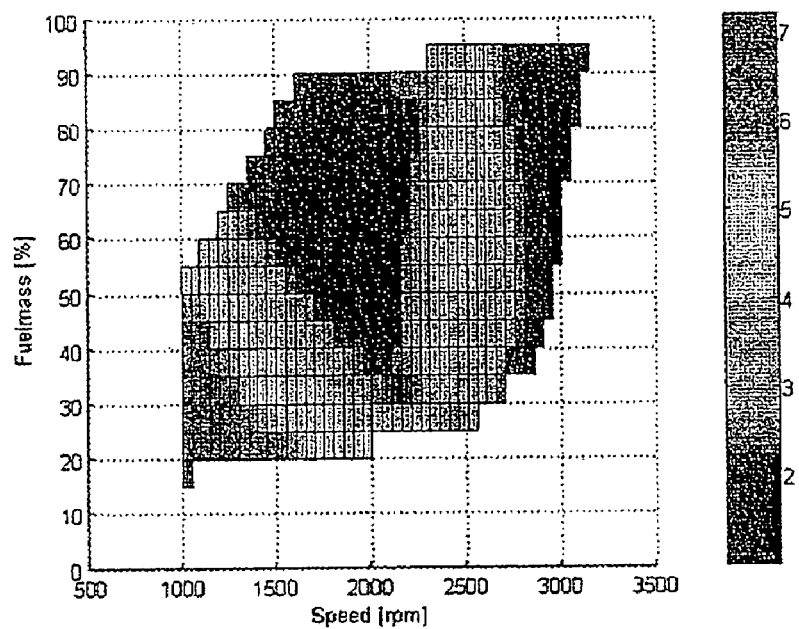
FIG. 51 shows a graph which represents a program map of the heat transfer factor.

A similar relationship between the optimum heat transfer factors, the speed, and the injected fuel quantity also results through an interpolation between the support points. The program map thus calculated, illustrated in FIG. 51, shows a surface having relatively soft transitions between the individual parameters.

Figure 52:
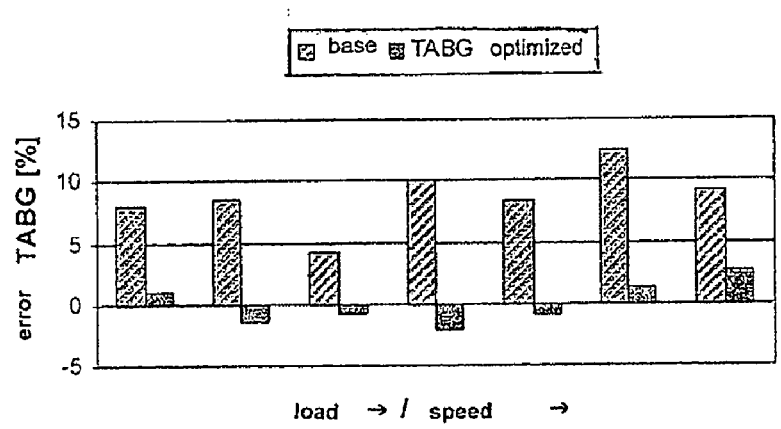
FIG. 52 shows a bar graph which displays the percent deviation of the exhaust gas temperature in the validation points.

For this reason, an improvement of the output variable TABG in all seven validation points is achieved, as by the transfer using model calculation (FIG. 52). The error may even be reduced to only 3%. This indicates that the model quality is not sufficient to transfer the optimized heat transfer factors correctly.

As shown in this chapter, there may be an improvement in the simulation of the exhaust gas temperature via the heat loss. However, this is only possible if the simulated temperature is too high in all points before the equalization. In other cases, for example, if it is simulated too low over the entire program map, the possibility thus results of increasing the wall temperature and heating the exhaust gas. For the case in which the starting base does not have a uniform picture, the wall temperature may be set individually for each operating point: either above or below the setpoint value, depending on whether it is to be heated or cooled.

Validation Using a Data Set

Figure 53:
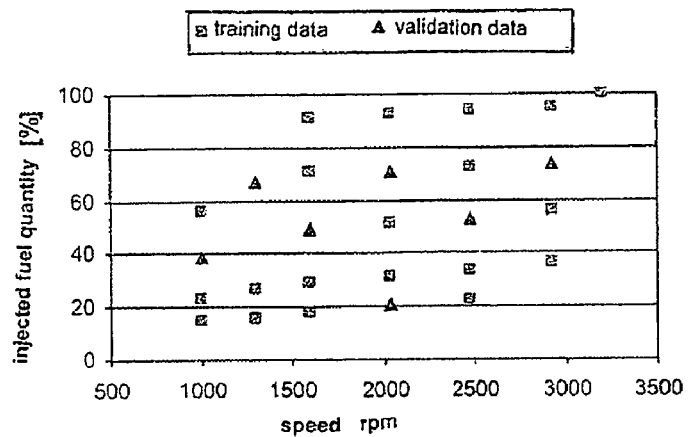
FIG. 53 shows a graph which displays the measurement points for direct calibration of the simulation model.

In a further step, the seven validation points were replaced to generalize the methodology described in the last chapter. In FIG. 53, the known measured points are once again plotted over speed and injected fuel quantity. As may be seen here, the nine validation data sets (square) partially lie in the boundary areas of the operating program map, so that another starting base for optimization results.

Figure 54:
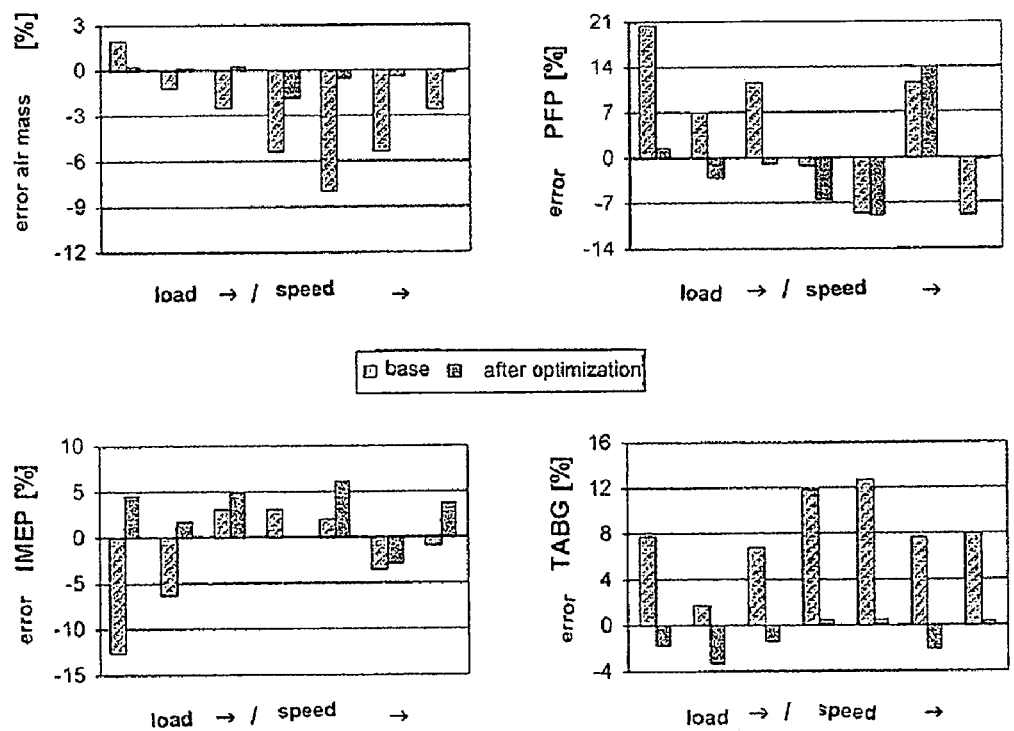
FIG. 54 shows graphs which display the percent deviation of the output variables in the validation points.

If the parameters of boost pressure offset, combustion duration, calibration factor, and heat transfer factor are now ascertained over the nine training points, similar results are achieved as described above:

FIG. 54 shows the percent deviations of each starting variable in the new validation points before the improvement and after the complete optimization procedure and the transfer over the entire program map by interpolation.

The error between simulated and measured air mass and between simulated and measured exhaust gas temperature is also minimized here: the error may be reduced to at most 2% and 3%, respectively. The graphs for the output variables PFP and IMEP show unexpectedly good results in this case. However, because of the difficulties established, it must be assumed that this improvement has occurred randomly. The equalization is thus strongly dependent on the selected points within the speed-load program map.

Figure 55:
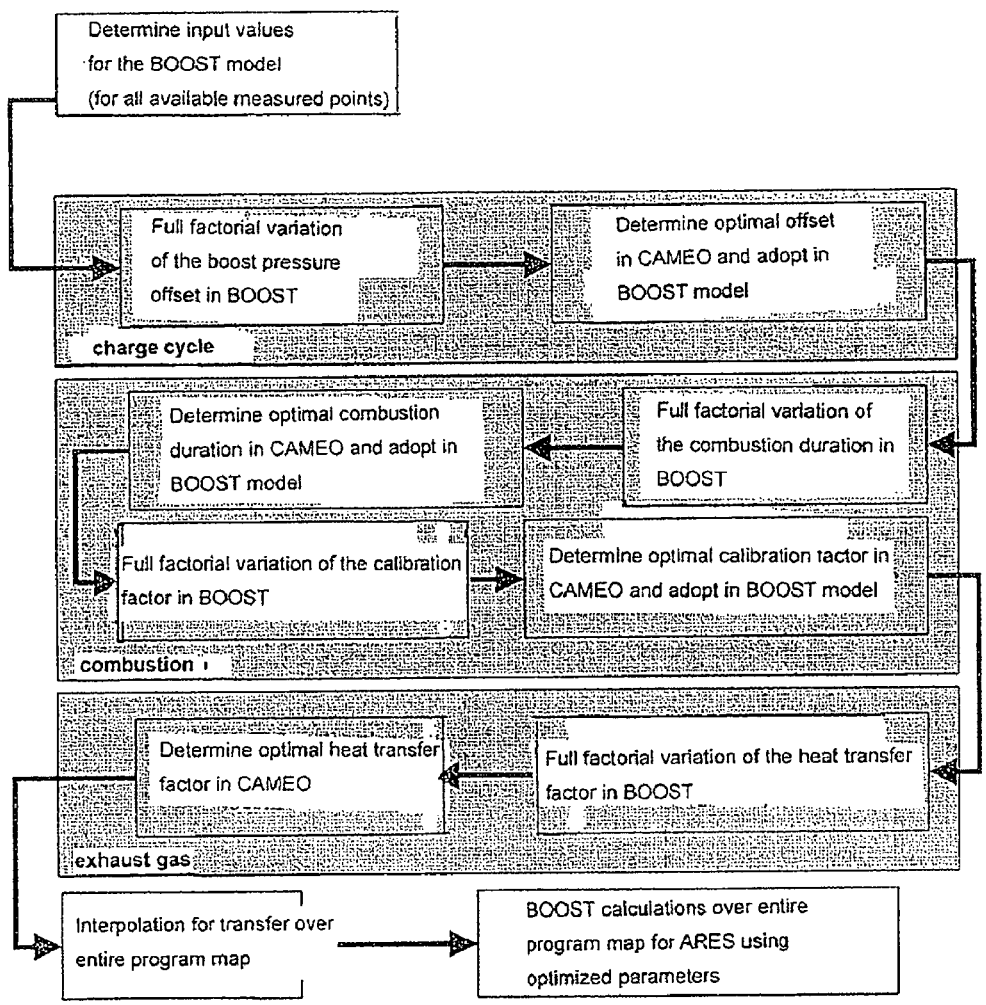
FIG. 55 shows a block diagram which represents the workflow for the compensation by calibrating a simulation model.

The entire workflow for the equalization by calibration of the simulation model is illustrated in FIG. 55.

The invention claimed is:

1. A computer-implemented method for analyzing behavior of a complex system by calculating a model which represents various measured variables as a function of input variables, comprising the following basic steps:
    selecting various measured points which correspond to different constellations of measured variables and performing measurements to ascertain measured variables on a real system;
    preparing the model which simulates dependence of the measured variables on the input variables and calibrating the model on the basis of the measured values of the real system obtained at the measured points;
    subdividing the model into at least two partial models;
    preparing one first partial model which simulates a first partial set of the measured variables;
    identifying at least one first main influence parameter having greatest influence on a measured variable simulated by the first partial model;
    determining an optimum value of each first main influence parameter in each measured point;
    interpolating each first main influence parameter for all meaningful constellations of input variables to calibrate the first partial model;
    preparing a further partial model to simulate a further partial set of the measured variables as a function of input variables and the previously ascertained first partial set of the measured variables;
    identifying at least one further main influence parameter having greatest influence on a measured variable simulated by the further partial model;
    determining an optimum value of each further main influence parameter in each measured point;
    interpolating each further main influence parameter for all meaningful constellations of input variables to calibrate the further partial model; and
    analyzing the behavior of the real system based on the calibrated partial models;
    wherein said real system is an internal combustion engine and at least one of the following variables are used as the measured variables:
    inflowing air mass,
    indexed mean pressure,
    maximum cylinder pressure, and
    exhaust gas temperature before catalytic converter and/or turbine.

2. The method according to claim 1, wherein multiple partial models are calibrated in sequence, the measured variables ascertained in each partial model representing input variables for subsequent partial models.

3. The method according to claim 1, wherein precisely one measured variable is ascertained in each partial model.

4. The method according to claim 1, wherein a single main influence parameter is assigned in a measured variable and the calibration of the associated partial model is performed by full factorial variation.

5. The method according to claim 1, wherein the interpolation of each main influence parameter is performed as a linear interpolation.

6. The method according to claim 1, wherein the optimum value of each main influence parameter in the measured points is determined in that a setpoint value for the particular measured variable is calculated for various discrete values of the main influence parameter, at predetermined support points, an interpolation model is prepared from the setpoint values thus calculated, which indicates setpoint values for the particular measured variable for arbitrary values of the main influence parameter, a difference between the setpoint values and the measured actual value of the measured variable is then minimized, and the optimum value of the main influence parameter is concluded therefrom.

7. The method according to claim 1, wherein a measured variable of at least one partial model of the at least two partial models is obtained by the following steps:
    selecting multiple first vectors, each of which represents a specific constellation of input variables and which cover a meaningful operating range of the real system;
    simulating by using the prepared model to obtain computational values of a measured variable which are assigned to the first vectors;
    selecting multiple second vectors, each of which represents a further constellation of input variables;
    performing measurements to obtain experimental values of the measured variable which are assigned to the second vectors;
    expanding each vector by one dimension by incorporating a block variable which is fixed at a first value for the first vectors and a second value for the second vectors, said first and second values being different from one another;
    preparing a multivariate regression model which represents the measured variable as a polynomial function of the expanded vectors of the input variables, on the basis of the previously determined computational values of the measured variable and the experimental values of the measured variable;

determining at least one third vector which represents a constellation of the input variables for which the system is to be analyzed;

expanding the third vector by a block variable which is fixed to the second value; and calculating the measured variable using the regression model having the expanded third vector as input variable.

8. The method according to claim 7, wherein the regression model is nonlinear.

9. The method according to claim 8, wherein the regression model is quadratic.

10. The method according to claim 7, wherein the number of the first vectors is greater than the number of the second vectors.

11. The method according to claim 7, wherein the input variables comprise speed and load.

12. A computer-implemented method for analyzing behavior of a complex system by calculating a model which represents various measured variables as a function of input variables, comprising the following basic steps:

selecting various measured points which correspond to different constellations of measured variables and performing measurements to ascertain measured variables on a real system;

preparing the model which simulates dependence of the measured variables on the input variables and calibrating the model on the basis of the measured values of the real system obtained at the measured points;

selecting multiple first vectors, each of which represents a specific constellation of input variables and which cover a meaningful operating range of the real system;

simulating by using the prepared model to obtain computational values of a measured variable which are assigned to the first vectors;

selecting multiple second vectors, each of which represents a further constellation of input variables;

performing measurements to obtain experimental values of the measured variable which are assigned to the second vectors;

expanding each vector by one dimension by incorporating a block variable which is fixed at a first value for the first vectors and a second value for the second vectors, said first and second values being different from one another;

preparing a multivariate regression model which represents the measured variable as a polynomial function of the expanded vectors of the input variables, on the basis of the previously determined computational values of the measured variable and the experimental values of the measured variable;

determining at least one third vector which represents a constellation of the input variables for which the real system is to be analyzed;

expanding the third vector by a block variable which is fixed to the second value; and calculating the measured variable and analyzing behavior of the real system using the regression model having the expanded third vector as the input variable;

wherein said real system is an internal combustion engine and at least one of the following variables are used as the measured variables:

inflowing air mass, indexed mean pressure, maximum cylinder pressure, and exhaust gas temperature before catalytic converter and/or turbine.

13. The method according to claim 12, wherein the regression model is nonlinear.

14. The method according to claim 13, wherein the regression model is quadratic.

15. The method according to claim 12, wherein the number of the first vectors is greater than the number of the second vectors.

16. The method according to claim 12, wherein the input variables comprise speed and load.

* * * * *